United States Patent
Stones

(10) Patent No.: US 7,401,660 B2
(45) Date of Patent: Jul. 22, 2008

(54) LATCH MECHANISM FOR PIVOTING HANDLE ASSEMBLY OF A POWER TOOL

(75) Inventor: Kevin Stones, Bishop Auckland (GB)

(73) Assignee: Black & Decker Inc., Newark, DE (US)

( * ) Notice: Subject to any disclaimer, the term of this patent is extended or adjusted under 35 U.S.C. 154(b) by 316 days.

(21) Appl. No.: 10/911,278

(22) Filed: Aug. 4, 2004

(65) Prior Publication Data

US 2005/0102839 A1 May 19, 2005

(30) Foreign Application Priority Data

Aug. 4, 2003 (GB) ................................. 0318150.0

(51) Int. Cl.
*B26B 19/02* (2006.01)

(52) U.S. Cl. ..................... 173/170; 173/171; 30/208; 30/381; 30/382; 30/216

(58) Field of Classification Search ............... 173/170, 173/171; 200/43.17, 334, 522, 43.11, 43.12, 200/43.13, 43.14, 43.15; 30/216, 208, 210, 30/381, 382; D8/8; 16/408, 409
See application file for complete search history.

(56) References Cited

U.S. PATENT DOCUMENTS

| | | | |
|---|---|---|---|
| 3,902,243 A | 9/1975 | Klebe, Jr. | |
| 4,206,657 A | 6/1980 | Palm | |
| 5,150,523 A | 9/1992 | McCurry | |
| 5,724,737 A * | 3/1998 | Stones | 30/228 |
| 5,757,154 A * | 5/1998 | Peot | 318/381 |
| 5,791,057 A * | 8/1998 | Nakamura et al. | 30/381 |
| 5,806,191 A * | 9/1998 | Yokoyama et al. | 30/216 |
| 6,178,642 B1 * | 1/2001 | Schaer | 30/216 |
| 6,698,566 B2 * | 3/2004 | Jong | 192/131 R |
| 7,275,322 B2 * | 10/2007 | Stones | 30/216 |
| 2004/0035009 A1 * | 2/2004 | Richards | 30/381 |
| 2005/0076510 A1 * | 4/2005 | Stones | 30/208 |
| 2005/0102840 A1 * | 5/2005 | Stones | 30/210 |
| 2005/0102842 A1 * | 5/2005 | Stones | 30/210 |
| 2005/0126009 A1 * | 6/2005 | Stones | 30/100 |
| 2005/0284647 A1 * | 12/2005 | Stones | 173/170 |

FOREIGN PATENT DOCUMENTS

| | | |
|---|---|---|
| EP | 0214455 A1 | 3/1987 |
| EP | 0687 410 A1 | 12/1995 |

(Continued)

*Primary Examiner*—Rinaldi Rada
*Assistant Examiner*—Michelle Lopez
(74) *Attorney, Agent, or Firm*—John Yun; Bruce S. Shapiro; Wesley Muller

(57) ABSTRACT

A latch mechanism for a power tool, such as a hedge trimmer, having a housing accommodating a motor and a handle assembly adapted to pivot relative to the housing in a plurality of positions. The latch mechanism includes a lever carrying a first and second retaining member that moves into and out of engagement with the handle assembly for locking and unlocking the handle assembly relative to the housing. The retaining members are biased towards their engaging conditions by a spring. An interlock member on lever cooperates with an arm member to prevent disengagement of the first and second retaining members from the handle assembly when the motor is actuated, and for preventing actuation of the motor when the first or second retaining member is in a retracted condition.

9 Claims, 22 Drawing Sheets

FOREIGN PATENT DOCUMENTS

| | | |
|---|---|---|
| EP | 1131994 A1 | 9/2001 |
| GB | 1193 654 A | 6/1970 |
| GB | 2336987 A | 11/1999 |
| GB | 2384678 A | 8/2003 |
| GB | 2396580 | 6/2004 |
| JP | 2002058341 A | 2/2002 |

\* cited by examiner

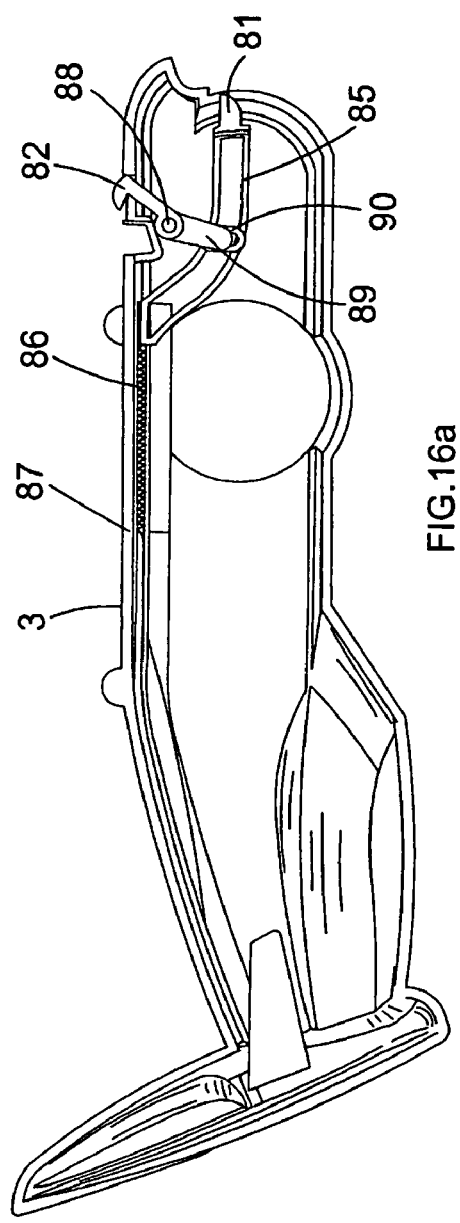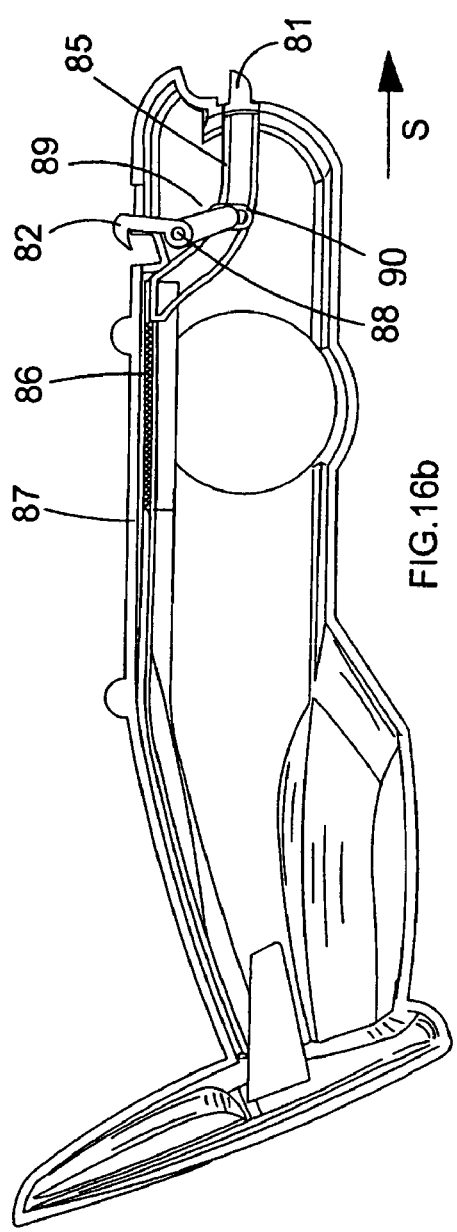

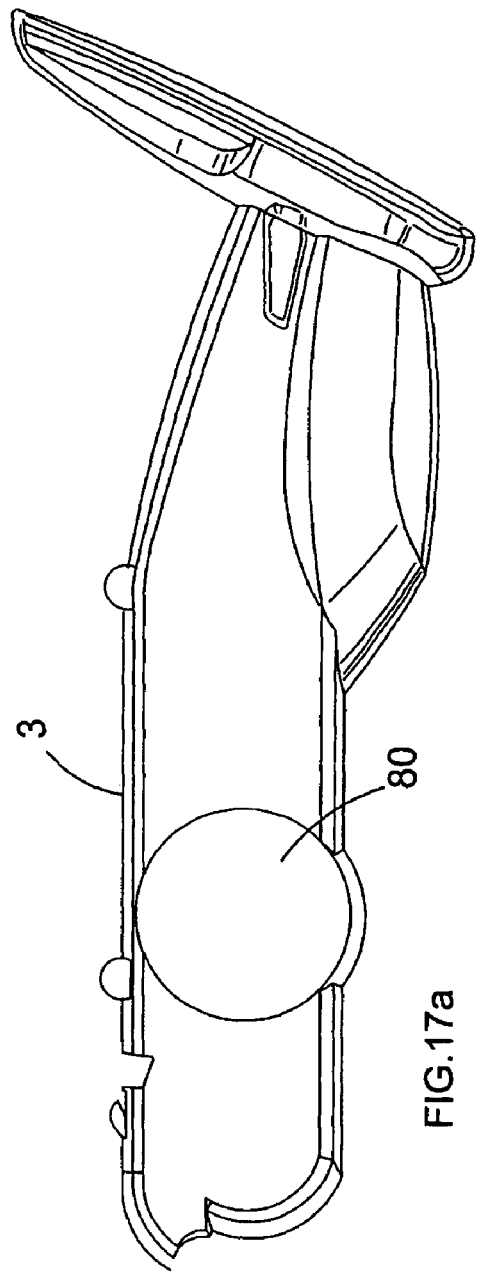
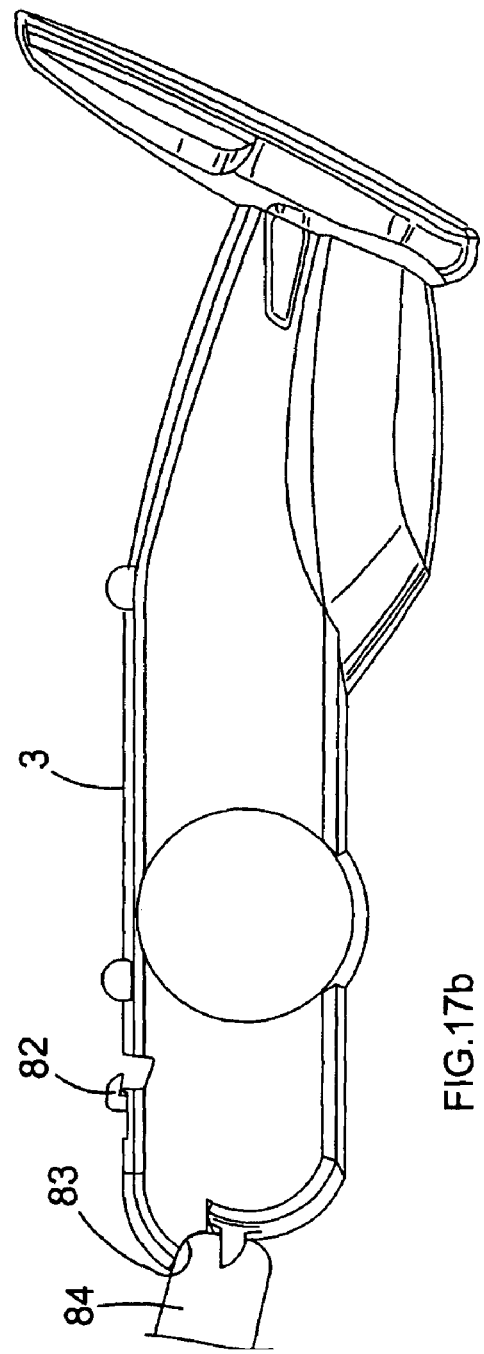

LATCH MECHANISM FOR PIVOTING HANDLE ASSEMBLY OF A POWER TOOL

BACKGROUND OF THE INVENTION

The present invention relates to a latch mechanism for a pivoting handle assembly of a power tool, and to a power tool incorporating such a mechanism. The invention relates particularly, but not exclusively, to a latch mechanism for the pivotable handle assembly of a hedge trimmer, and to a hedge trimmer incorporating such a mechanism.

Hedge trimmers are power tools for general garden use with an axially reciprocating blade comprising a plurality of teeth disposed adjacent a stationary blade, the teeth of the stationary blade providing a reaction force for the teeth of the reciprocating blade.

Most hedge trimmers are provided with two handles for the user to grip. This is generally for two reasons. Firstly, a hedge trimmer is easier to manipulate when held with both hands than when held with one hand. This provides the user with greater control over the hedge trimmer and therefore facilitates more accurate cutting. Secondly, a two handed grip is a safety feature. It is significantly easier to lose control of a hedge trimmer when holding it with one hand, and therefore a two handed grip allows much safer use of the hedge trimmer.

When hedge trimmers are used to cut high up relative to the user's body, for example to cut the horizontal upper surface of a hedge, most hedge trimmers have to be held with both hands above head height and with the hedge trimmer upside down. This can be tiring for the user and generally makes the user feel unstable as the centre of mass of the user and hedge trimmer is moved further up the user's body. This situation can be particularly dangerous when a user has mounted a set of step ladders, and is therefore even more unstable than he would be were he standing on the ground.

For this reason, the handle assembly of the hedge trimmer may be pivotable relative to the hedge trimmer housing in order to enable the user easier access to higher and lower cutting positions.

Power tools are known which comprise a body portion pivotable relative to a handle assembly, for example in EP 0834248. However, such power tools suffer from the drawback that mechanisms consisting of many components are necessary to enable the tool to be locked in more than one position.

Preferred embodiments of the present invention seek to overcome the above disadvantage of the prior art.

SUMMARY OF THE INVENTION

According to an aspect of the present invention, there is provided a latch mechanism for a power tool having a housing, a motor provided in the housing, an output shaft adapted to be caused by said motor to actuate a working member, and a handle assembly adapted to pivot relative to the housing between a plurality of positions, the latch mechanism comprising:

first detent means having at least one first detent member adapted to move relative to the housing between an engaging condition to engage said handle assembly to releasably retain the housing in at least one first said position relative to the handle assembly, and a retracted condition for allowing pivotal movement of said housing relative to said handle assembly;

second detent means having at least one second detent member adapted to move relative to the housing between an engaging position to engage said handle assembly to releasably retain the housing in at least one second said position relative to the handle assembly, and a retracted condition for allowing pivotal movement of said housing relative to said handle assembly;

biasing means for urging at least one said first detent member and at least one said second detent member towards said engaging condition; and interlock means for preventing disengagement of said first and/or second detent means from said handle assembly when said motor is actuated, and for preventing actuation of said motor when a said first and/or second detent member is in a said retracted condition.

By providing interlock means which prevents disengagement of the first and/or second detent means from the handle assembly when the motor is actuated, and prevents actuation of the motor when a first or second detent member is in a retracted condition, this provides the advantage of minimising the risk of the motor of a power tool incorporating the mechanism being energised while the housing is able to pivot relative to the handle assembly, thus in turn increasing the safety of the power tool.

The mechanism may further comprise electrical switch means adapted to be located in said housing for actuating said motor, wherein said interlock means is adapted to prevent actuation of said switch means when a said first and/or second detent member is in a said retracted condition.

The electrical switch means may comprise a switch housing having a plurality of electrical contacts, a first switch member adapted to be pressed inwardly of said switch housing to energise said motor, and a second switch member adapted to brake said motor when said first switch member energises said motor, and to be pressed inwardly of the switch housing to disable said braking action.

This provides the advantage of further enhancing the safety of a power tool incorporating the latch mechanism by bringing a working member of the tool, such as a hedge trimmer blade, to a halt as rapidly as possible.

The second switch member may be adapted to brake said motor by short-circuiting said motor.

The mechanism may further comprise at least one actuator member adapted to engage said electrical switch means, wherein said interlock means comprises at least one interlock member connected to at least one said first and second detent member for preventing the or each said actuator member engaging said electrical switch means when said first or second detent member is in a said retracted condition.

This provides the advantage of enabling the interlock function to be achieved in a simple, reliable and cost effective manner.

At least one said actuator member may be adapted to abut at least one said interlock member when said electrical switch means is actuated to prevent movement of at least one said first and/or second detent member relative to the housing to a retracted condition thereof.

At least one said actuator member may be adapted to pivot relative to the housing to engage said electrical switch means, and said interlock member may be adapted to abut said actuator member to prevent pivoting thereof into engagement with said switch means when a said first and/or second detent member is in a said retracted condition.

The mechanism may further comprise at least one pin adapted to be slidably mounted to said handle assembly to engage at least one respective cam surface on at least one said actuator member to pivot said actuator member relative to said housing.

According to another aspect of the present invention, there is provided a power tool comprising:
a housing;
a motor provided in the housing;
an output shaft adapted to be caused by said motor to actuate a working member;
a handle assembly adapted to pivot relative to the housing between a plurality of positions; and
a latch mechanism as defined above.

The power tool may further comprise at least one protrusion on said housing to prevent movement of at least one said pin relative to said handle assembly when the housing is not in a said first or second position relative to the handle assembly.

This provides the advantage of further enhancing the safety of the power tool by preventing energisation of the motor even if a said first or second detent member is not in a retracted condition thereof.

In a preferred embodiment, at least one said first detent member is connected to a release button, at least one said second detent member is pivotally connected to a respective said first detent member, and the tool further comprises biasing means acting between the housing and said first detent member for urging the first detent member towards an engaging condition thereof.

In a preferred embodiment, the power tool is a hedge trimmer.

BRIEF DESCRIPTION OF THE DRAWINGS

Preferred embodiments of the present invention will now be described, by way of example only and not in any limitative sense, with reference to the accompanying drawings in which:

FIG. 10b is a top view of the gear conversion mechanism of FIG. 10a; and

FIG. 16a is a cross sectional side view of the hedge trimmer housing with the latch mechanism in the open position;

FIG. 16b is a cross sectional side view of the hedge trimmer housing of FIG. 16 with the latch mechanism in the closed position;

FIG. 17a is a side view of the hedge trimmer housing, with the latch mechanism in the open position;

FIG. 17b is a side view of the hedge trimmer housing of FIG. 16a, with the latch mechanism in the closed position and engaging the hedge trimmer handle assembly;

DETAILED DESCRIPTION OF THE DRAWINGS

Figure 1:
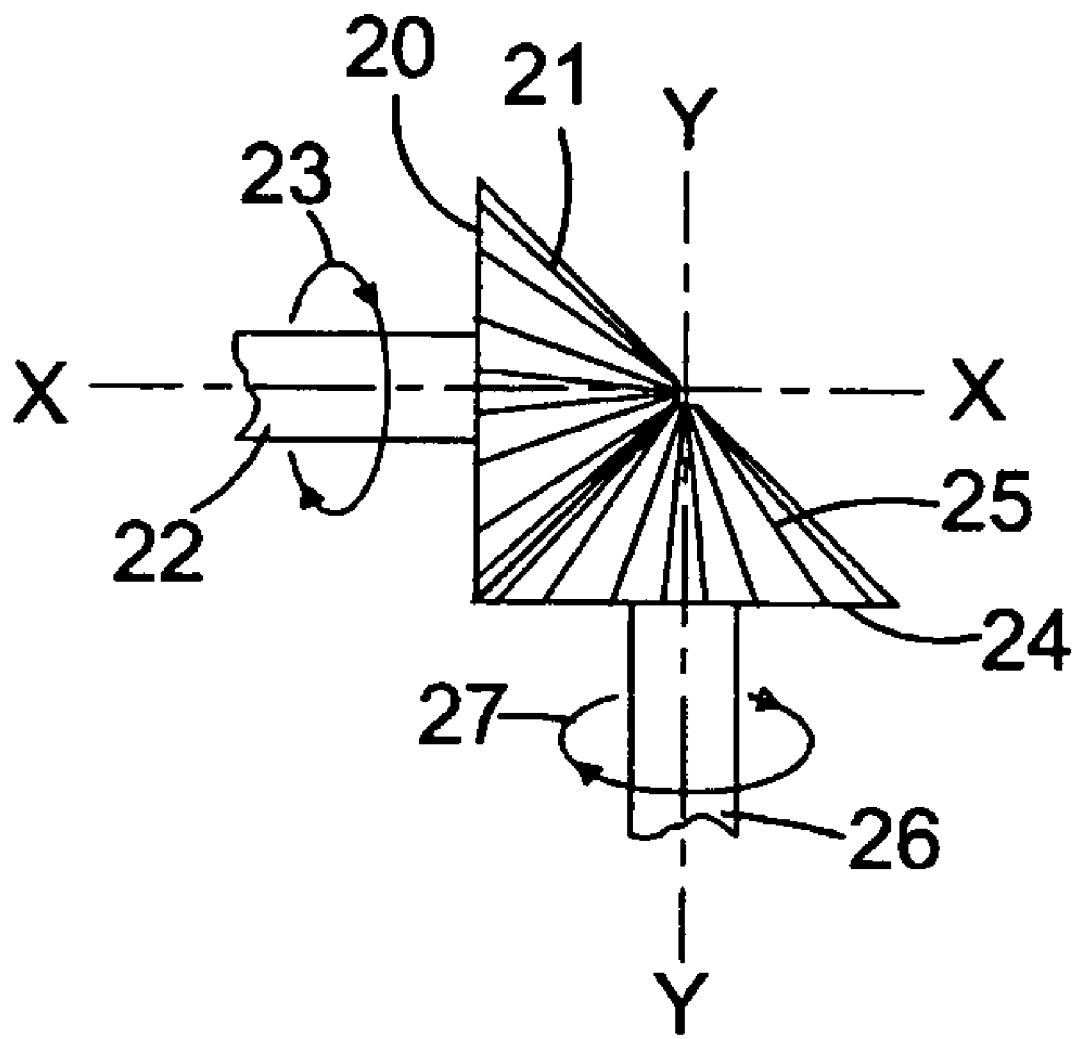
FIG. 1 is a side view of a prior art truncated conical bevel gear assembly for use in a hedge trimmer.
Figure 2:
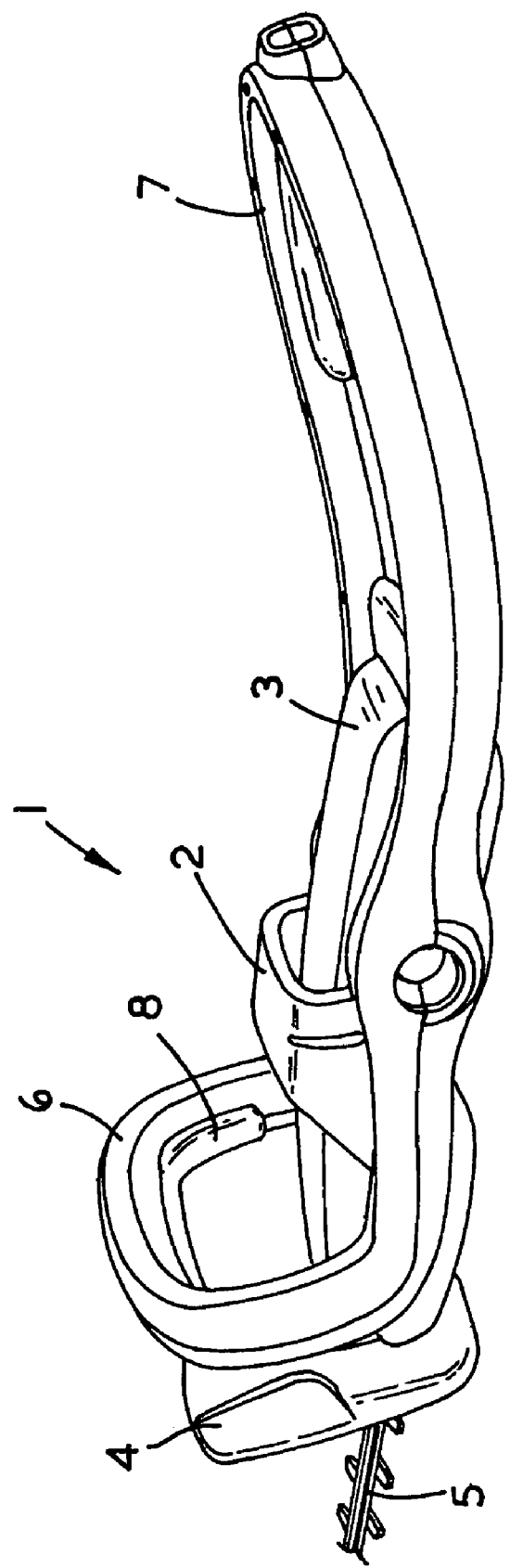
FIG. 2 is a perspective view from a first side of a hedge trimmer of a first embodiment of the present invention.

Referring to FIG. 2, a hedge trimmer (1) comprises a handle assembly (2) formed from durable plastics material pivotably connected to a housing (3). A guard (4) is formed integrally with the housing (3) and an electric motor (not shown) is disposed axially within the housing (3) such that the axis of rotation of an output shaft (not shown) of the motor is generally parallel to the direction of reciprocating motion of a blade assembly (5).

The blade assembly (5) extends forwardly of the housing (3). The electric motor (not shown) is connected to the blade assembly via a drive conversion mechanism, the operation of which will be described in further detail below. The blade assembly (5) comprises a stationary blade disposed adjacent to a blade adapted to execute reciprocating movement along a longitudinal axis of the stationary blade. In this way, the stationary blade provides a reaction force for the reciprocating blade to grip against and cut. The operation of this type of blade assembly is well known in the art and will not be described in any further detail herein.

The handle assembly (2) comprises a forward handle (6) and a rear handle (7). Both forward and rear handles (6), (7) are formed integrally from moulded durable plastics and enable a user to hold the hedge trimmer in a variety of ways. As is well known in the art, it is desirable for certain power tools such as chainsaws, hedge trimmers and circular saws to have two handles for the user to grip, one with either hand. A two-handle assembly has two advantages. Firstly, when the tool is gripped in both hands it is more stable in the user's hands and therefore easier to control, which enables more accurate and precise cutting. Secondly, a two-handed grip on the hedge trimmer is a lot safer than a single handed grip. It is a lot easier for a user to lose control of a hedge trimmer when gripping it with only one hand.

Figure 3:
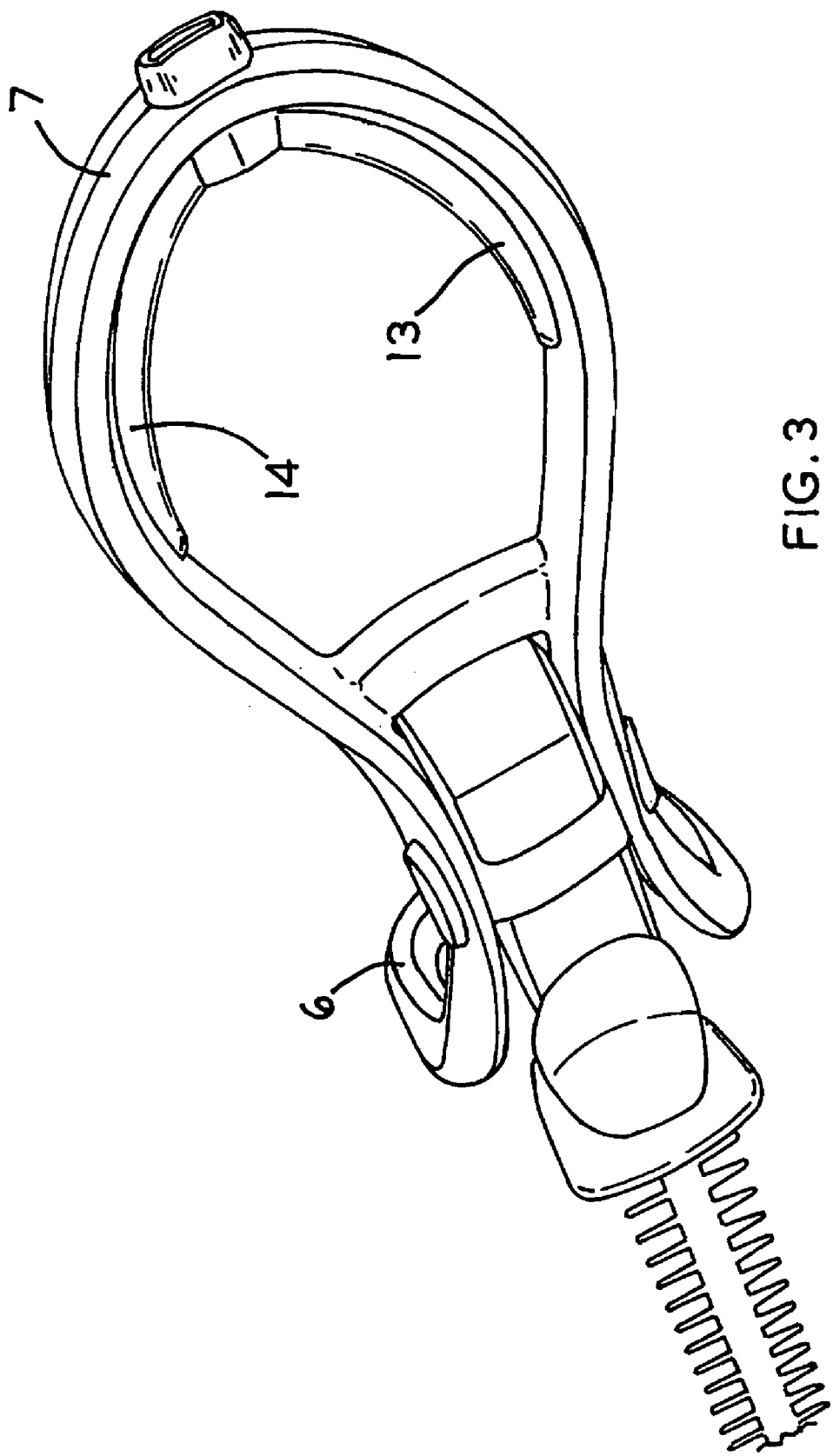
FIG. 3 is a perspective view from below of the hedge trimmer of FIG. 2.

The hedge trimmer is provided with a dual switching mechanism. In order to activate the hedge trimmer, the user must simultaneously depress a forward switch (8) and either one of rear switches (13), (14), as shown in FIG. 3. As a result, it is impossible for the user to activate the hedge trimmer without first gripping it with both hands.

Figure 4:
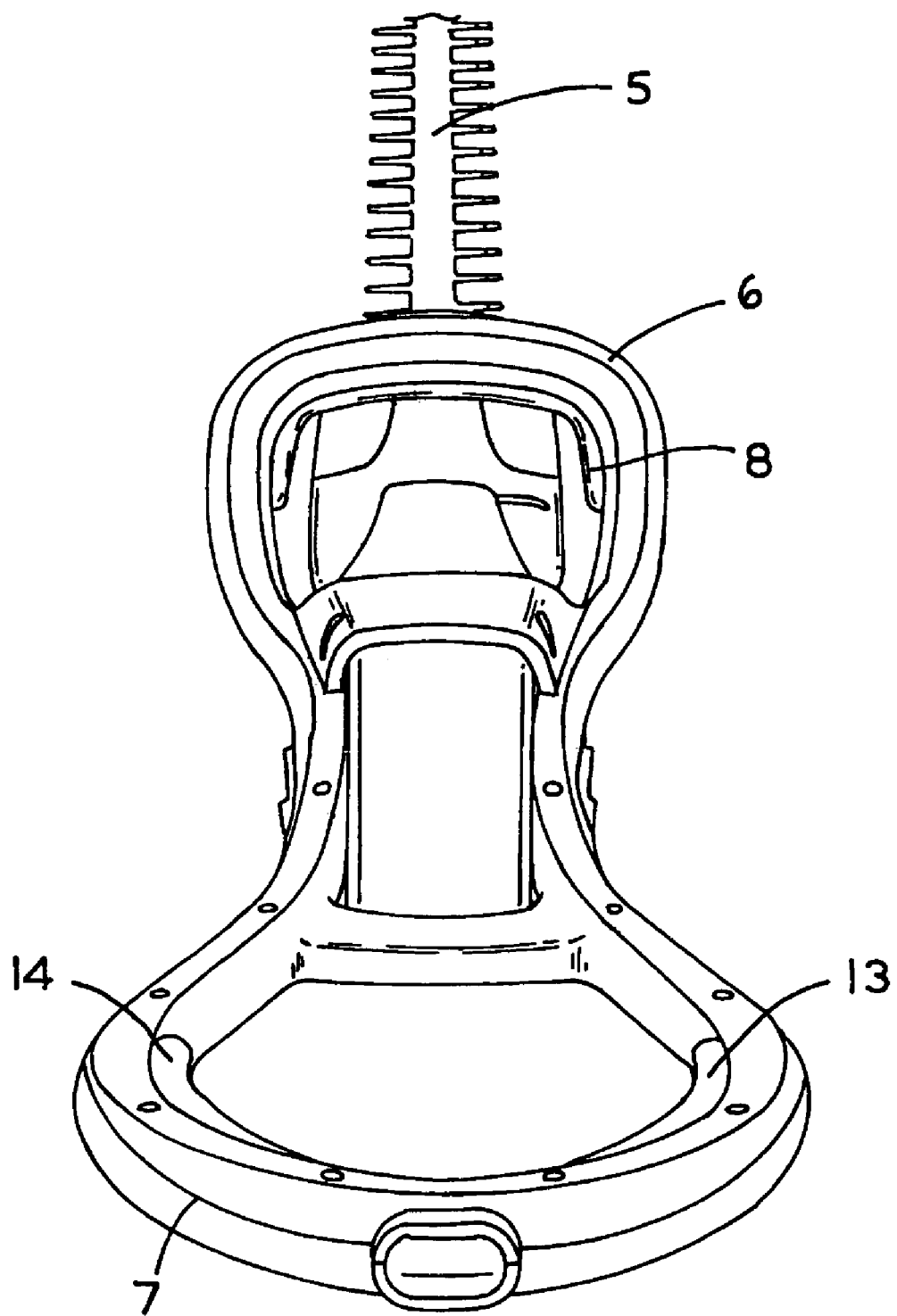
FIG. 4 is a rear perspective view of the hedge trimmer of FIG. 2.

It is desirable when operating a hedge trimmer with the blade in the vertical plane for the user to be able to grip the hedge trimmer without twisting either wrist at an angle relative to the other. Referring to FIG. 4, the present invention provides a handle assembly which allows a left-handed user and a right-handed user to operate the hedge trimmer in any orientation with the wrists of each arm aligned, i.e. with the wrists arranged along parallel axes. For example, the right-handed user would grip forward handle (6) with his left hand such that the fingers of his left hand pass around the front of forward handle (6) and grip switch (8) with the fingertips of his left hand. The right-handed user would place his right hand around rear handle (7) such that the fingertips of his right hand grip switch (13). It can be seen that in this orientation the right-handed user holds the hedge trimmer such that the insides of his wrists are facing each other and his wrists are aligned in planes generally parallel to the plane of the blade. The same can be said of the left-handed user. However the left-handed user would grip forward handle (6) with his right hand and rear handle (7) with his left hand such that the fingertips of his left hand are in a position to depress switch (14).

This feature of the present invention offers several advantages over the prior art. Firstly, holding the hedge trimmer without a twist in the user's arm is more comfortable, and affords the user more control over the hedge trimmer blade. Secondly, prior art hedge trimmers must be held with a twist in the user's arm. Over prolonged periods of use, the user's arms may tire, and apply an unwanted torque to the hedge trimmer as the muscles of the user's forearms attempt to orientate themselves into a more comfortable position. This makes it more difficult to accurately cut with the hedge trimmer.

Figure 5:
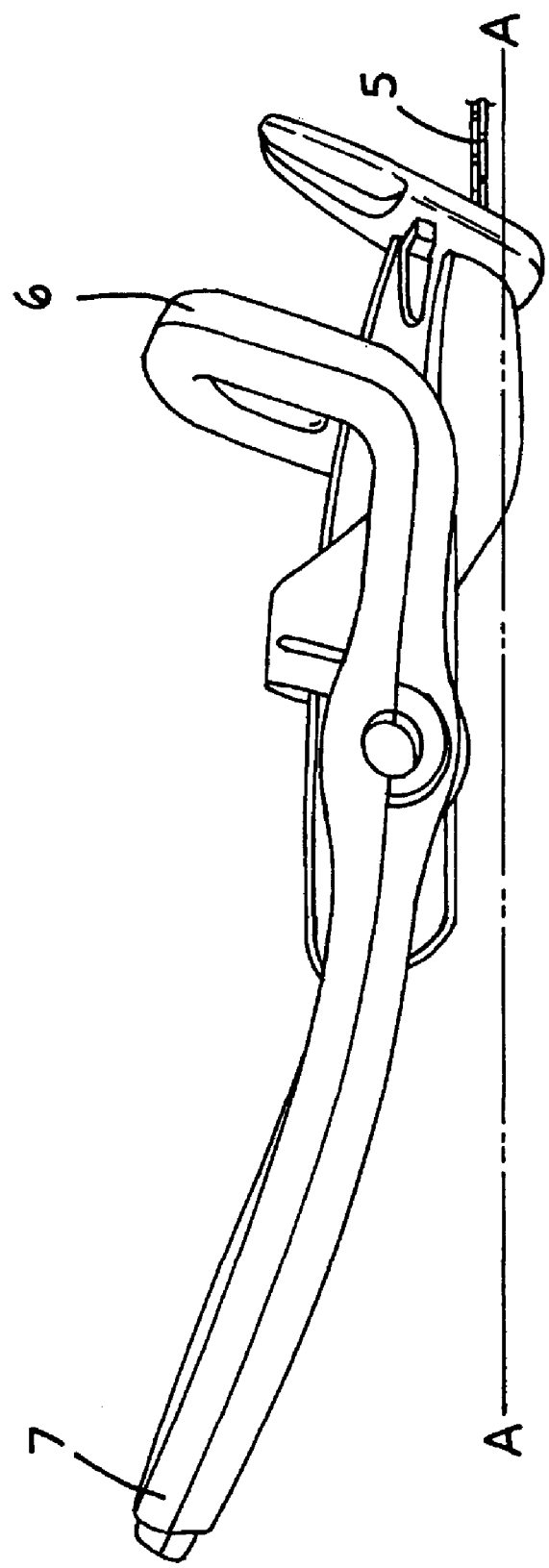
FIG. 5 is a side perspective view of the hedge trimmer of FIG. 2, from the opposite side as that shown in FIG. 2.

Referring to FIG. 5, line A-A represents the plane of blade assembly (5). The plane of rear handle (7) is at an angle to line A-A such that the rear part of rear handle (7) is raised substantially away from the plane of blade (5). As a result of this, the knuckles of the hand of the user that is gripping rear handle (7) are raised away from the surface of the hedge being cut. This provides the advantage that the user's knuckles avoid any grazing or cutting resulting from contact with the hedge, or with the ground when carrying out low cutting.

Figure 6:
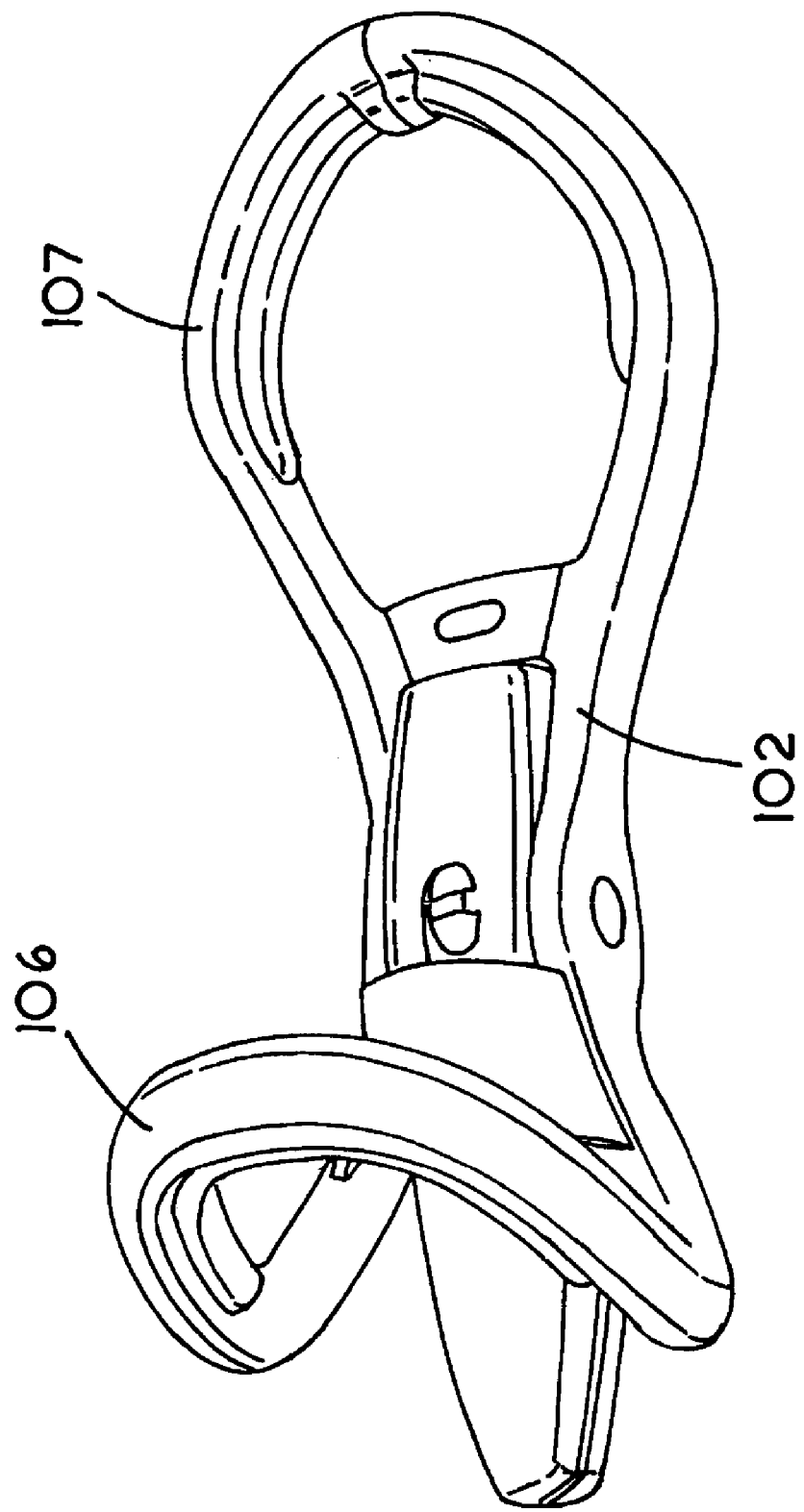
FIG. 6 is a perspective view from above of a hedge trimmer of a second embodiment of the present invention.
Figure 7:
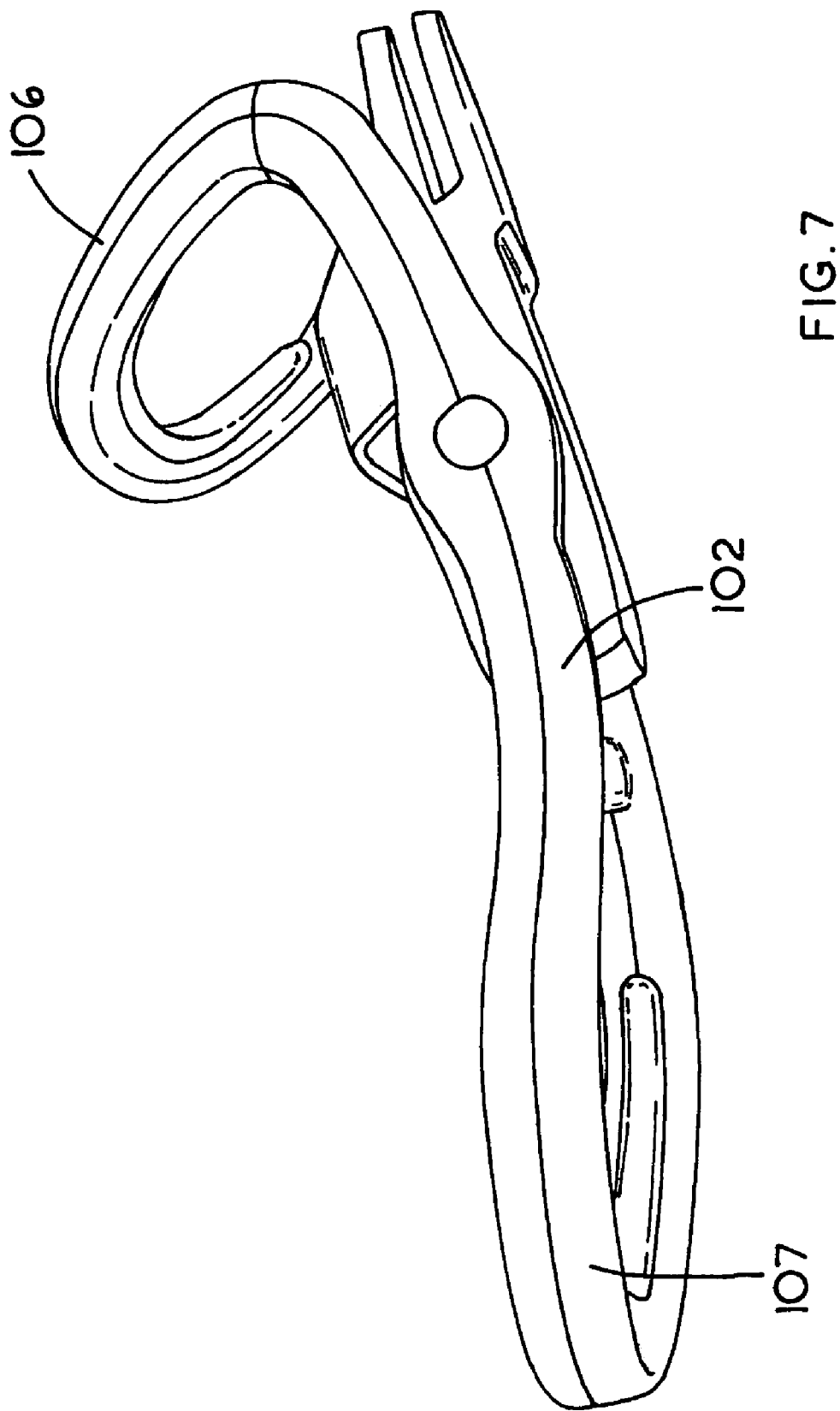
FIG. 7 is a side perspective view of the handle assembly and body of the hedge trimmer of FIG. 6.

Referring to FIGS. 6 and 7, in which parts common to the embodiment of FIGS. 2 to 5 are denoted by like reference numerals but increased by 100, a second embodiment of the handle assembly (102) is shown. It can be seen that front handle (106) is swept back at a greater angle relative to the plane of the blade compared with the angle of front handle (6) relative to the plane of blade (5) as shown in FIG. 5. This feature makes the hedge trimmer more comfortable for the user to operate provided that the centre of mass of the hedge trimmer lies in the region between front handle (106) and rear handle (107) which will usually be the case, since the heaviest parts of the hedge trimmer are generally the blade and the motor housing. The user does not have to stretch his forward arm as far relative to the rear handle as he would do when using the handle assembly shown in FIG. 5.

It is therefore desirable to have the rear handle located as far away from the centre of mass as is possible. Since the two heaviest components of a hedge trimmer are generally the electric motor disposed in the housing and the forward blade assembly, the centre of mass of the hedge trimmer generally lies between the motor and the blade.

In order to make the hedge trimmer easier to manipulate, it is desirable to locate the rear handle (7), (107) as far away from the centre of mass as possible. This is because the further away the rear handle is from the centre of mass, the less force is needed to be applied to the rear handle to apply the same torque to the hedge trimmer. One way of achieving this is to make the rear handle as large as possible without increasing the weight of the rear handle, and for this reason the rear handle (7), (107) of the hedge trimmer is formed into the curved bar loop shape with a space enclosed as is best shown in FIG. 2 or in FIG. 6.

The handle assembly (7) of the present invention enables the user to operate the hedge trimmer for cutting a horizontal surface such that the wrists of the user's arms are oriented generally parallel to one another. Also, as described above, when the blade is required to be operated in the vertical plane, the user can operate the hedge trimmer with his wrists arranged in generally parallel vertical planes.

A problem can arise with prior art hedge trimmers when a horizontal surface to be cut is high up relative to the user such as the horizontal upper surface of a tall hedge, as the user may have to stretch and hold the hedge trimmer above his head. This is undesirable for the user especially when the user is on stepladders or other apparatus to raise the user from the ground. When the user is holding the hedge. trimmer high up relative to his body or even holding the hedge trimmer above his head in order to cut a horizontal surface, the user is less stable than he would be were he operating the hedge trimmer further down relative to his body. Furthermore, although hedge trimmers can generally be operated upside down, it has been found that consumers are generally very reluctant to operate hedge trimmers upside down whilst held above the head.

Figure 8:
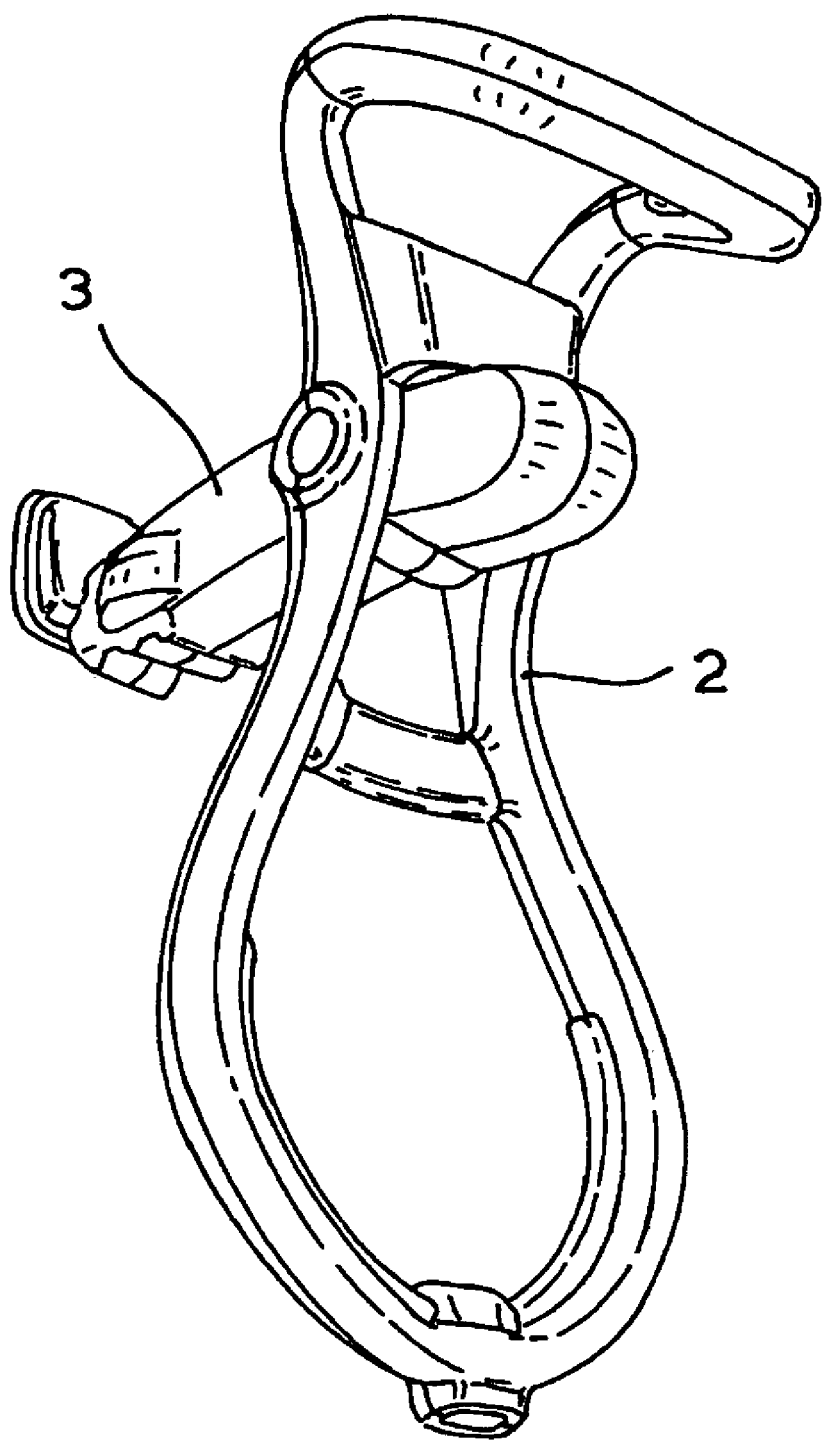
FIG. 8 is a side and rear perspective view of the handle assembly and body rear of the hedge trimmer of the present invention with the body portion tilted at an angle to the handle assembly.
Figure 9:
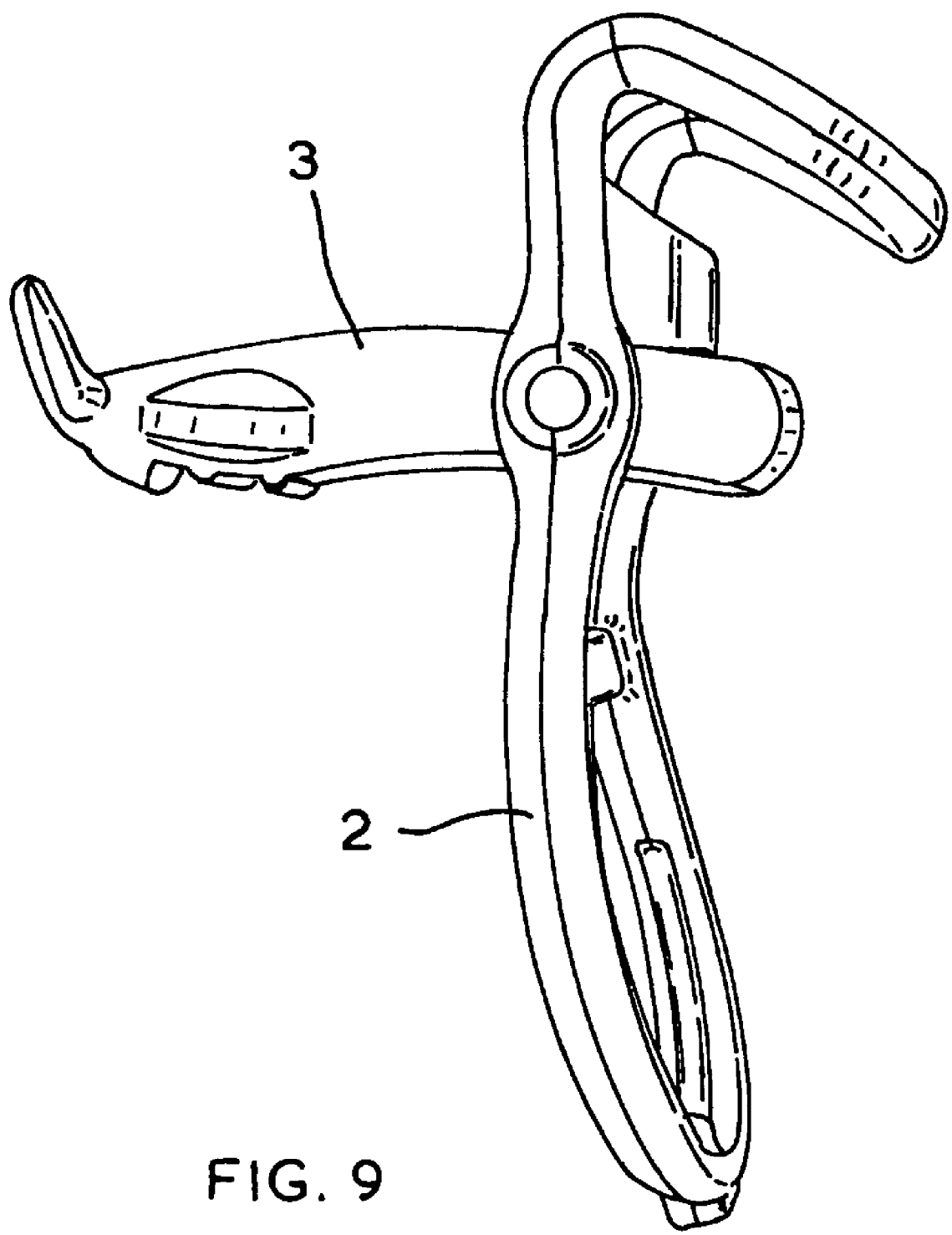
FIG. 9 is a further side perspective view of the hedge trimmer of FIG. 8.

Referring to FIGS. 8 and 9, the hedge trimmer is shown without the forwardly projecting blade where the body housing (3) has been pivoted relative to the handle assembly (2). In this orientation, the hedge trimmer is operated in exactly the same way as before, with the user gripping both forward and rear handles and depressing forward and rear switches respectively. This feature makes it easier for the user to view along the plane of the blade when cutting the top of a tall hedge, and more comfortable for horizontal cutting in a position high up relative to the user's body. This is because instead of the user having to hold the handles horizontally at eye level as with prior art hedge trimmers, the user can now hold the handle assembly in front of his body whilst looking along the plane of the blade.

Referring to FIGS. 16a and 16b, the operation of the latch mechanism for holding the hedge trimmer in either of the orientations described above will now be described.

A first retaining member (81) is mounted at a first end of a bracket (85), and the other end of bracket (85) is mounted on a compression spring (86). Compression spring (86) is fixed to the body of the jigsaw housing at (87). A second retaining member (82) is able to pivot about a pin (88), pin (88) being fixed relative to the housing (3). Second retaining member (82) is also rigidly fixed to a first end of a lever (89), the second end of lever (89) being slidable in a second bracket (90), second bracket (90) being formed in first bracket (85).

When the first bracket (85) is moved in the direction of arrow S from the configuration shown in FIG. 16a to the configuration of FIG. 16b as a result of compression spring (86) extending, it can be seen that firstly the first retaining member (81) is pushed out of the back of the housing (3). Secondly, as a result of lever (89) sliding upwardly in second bracket (90), the second retaining member (82) is pivoted about pin (88) and out of housing (3).

In the configuration of FIG. 16b, either the first or second retaining means (81, 82) will engage with a corresponding portion of the handle assembly (not shown), and a user would release the mechanism simply by pushing the retaining member which is not in engagement with the handle assembly back into the housing, as this action would also result in retracting the other retaining member from engagement with the handle assembly.

Referring to FIGS. 17a and 17b, the hedge trimmer housing (3) engages the hedge trimmer handle assembly at a cylindrical pivot (80) such that the housing (3) can rotate about pivot portion (80). The hedge trimmer can be operated in two separate orientations, the in-line orientation as shown in FIG. 2, or the orientation shown in FIGS. 8 and 9 where the hedge trimmer housing (3) is rotated through 90° relative to the hedge trimmer handle assembly (2).

In order to retain the hedge trimmer housing (3) in position relative to the handle assembly (not shown), the housing (3) is provided with a first retaining member (81) and a second retaining member (82). Both first and second retaining members (81, 82) are retractable relative to the housing (3), and are shown in their respective retracted positions in FIG. 17a. The rear end of housing (3) has an integrally formed abutment surface (83) shaped to receive an engaging portion (84) of handle assembly (2). It can be seen that the engaging portion (84) of the handle assembly is received between abutment surface (83) of the housing (3) and the first retaining member (81) such that the engaging portion (84) can not move in either the upwards or downwards direction relative to housing (3). The first retaining member (81) is so shaped that the engaging portion (84) can slide into engagement with abutment surface (83) by displacing retaining member (81), but cannot move out of engagement with abutment surface (83) until retaining member (81) is retracted into the housing (3).

When the hedge trimmer is used in the orientation shown in FIGS. 8 and 9, second retaining member (82) grips a second engaging portion (not shown) of the handle assembly, and in this orientation even though first retaining member (81) is deployed, it is not in use. In order to release the latch mechanism, either first or second retaining members (81, 82) can be depressed by the user, depending on which one is not in engagement with the handle assembly, which simultaneously moves both first and second retaining members (81, 82) into the housing.

Figure 13:
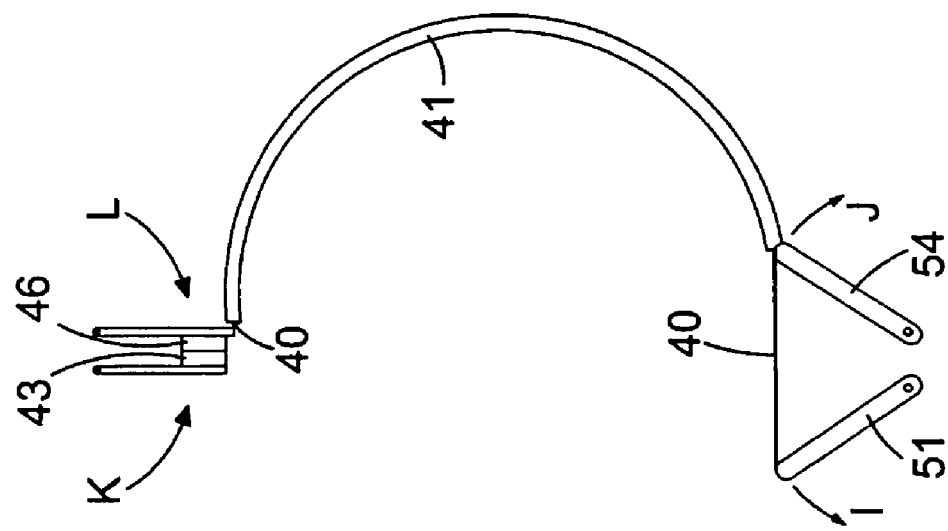
FIG. 13 is a schematic view of the switching mechanism of FIG. 12 in the closed position.
Figure 12:
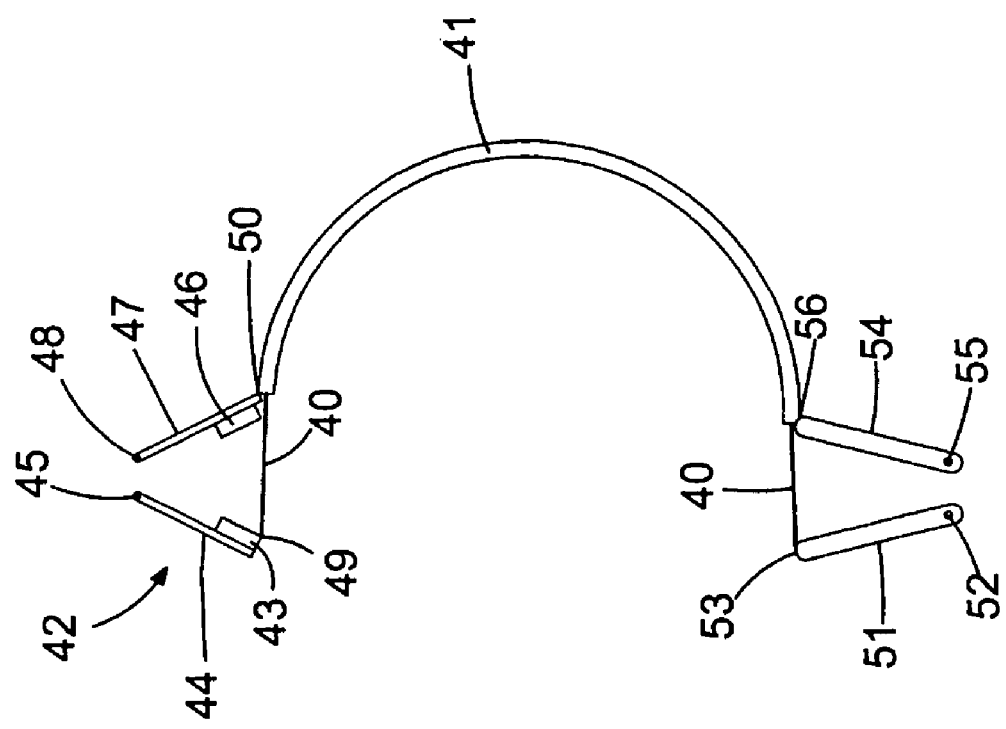
FIG. 12 is a schematic view of a switching mechanism of the present invention in the open position.

Referring to FIGS. 12 and 13, the dual switching mechanism of the present invention will now be described.

A bowden cable, such as that used to operate the brakes on a pedal bicycle, consists of an inner cable (40) surrounded by an outer sheath (41). The inner cable (40) passes through the outer cable (41) and is slidable relative thereto. An electrical contact shown generally by (42) comprises a first metallic pad (43) mounted on an arm (44), the arm being pivotable about point (45) and a second metallic pad (46) mounted on a second arm (47), the second arm being pivotable about point 48 such that metallic pads (43) and (46) can be pivoted towards each other, and into contact.

A first end of inner cable (40) is attached to metallic pad (43) at point (49), and a first end of outer cable (41) is attached to arm (47) at point (50).

A first switch (51) on rear handle (107) (FIG. 6) comprises an arm that is pivotable about point (52), the arm being attached to a second end of inner cable (40) at point (53). A second switch (54) on rear handle (107) is pivotable about point (55) and is attached to the outer cable at point (56).

Referring to FIG. 13, first switch (51) and second switch (54) are operated by a user applying pressure and pivoting them away from each other in the direction shown by arrows I and J. As first switch (51) is rigidly attached to the inner cable (40), and second switch (54) is rigidly attached to the outer cable (41), the pivoting motion of the switches in opposite directions draws the inner cable (40) through outer cable (41), whilst at the same time second switch (54) pushes outer cable (41) around inner cable (40). As a result of this, inner cable (40) pulls first metallic pad (43) in the direction of arrow K, and outer cable (41) pushes the second metallic pad (46) in the direction of arrow L such that pads (43), (46) come into contact.

It can be seen then that if only one switch, either (51) or (54), is moved whilst the other switch remains in the open position, the resulting movement of the bowden cable would only consist of independent movement of either the inner (40) or outer cable (41) such that the contact would only be half closed, as only one metallic pad would be moved into a contacting position. The contacts (43), (46) are then closed by actuating a switch (not shown) on front handle (106) (FIG. 6) to cause further movement of the inner cable (40) relative to the outer sheath (41).

It should also be appreciated that further embodiments of a switching mechanism of this type are possible with more than two switches. For example, a single inner cable (40) can be provided with a plurality of outer sheaths (41), each outer sheath moving independently of one another which provides the option of adding more switches and/or electrical contacts. It should also be noted that in practice, taking the example of a two switch mechanism, the mechanism will be set up such that closing one switch will have the result of partially closing the contact by more than half the distance required to fully close the contact, and closing the second switch will also have the result of more than half closing the contact. In this way, it is ensured that the contact will actually be closed when the switch on front handle (106) and one of the switches (51), (54) on rear handle (107) are simultaneously actuated. Table 1 below shows the various possible states of operation of the switches.

TABLE 1

| Condition of switch on front handle 6, 106 | Condition of switch 51, 54 on rear handle 7, 107 | Condition of motor |
| --- | --- | --- |
| OFF | OFF | OFF |
| OFF | ON | OFF |

TABLE 1-continued

| Condition of switch on front handle 6, 106 | Condition of switch 51, 54 on rear handle 7, 107 | Condition of motor |
|---|---|---|
| ON | OFF | OFF |
| ON | ON | ON |

It should also be appreciated that FIGS. 12 and 13 are only a schematic representation of the switching mechanism, and in practise the contacts be in the form of something other than pivoting metallic pads, as will be described below.

Referring to FIGS. 14a to 15c, the operation of the pivoting switching mechanism will now be described.

Figure 14A:
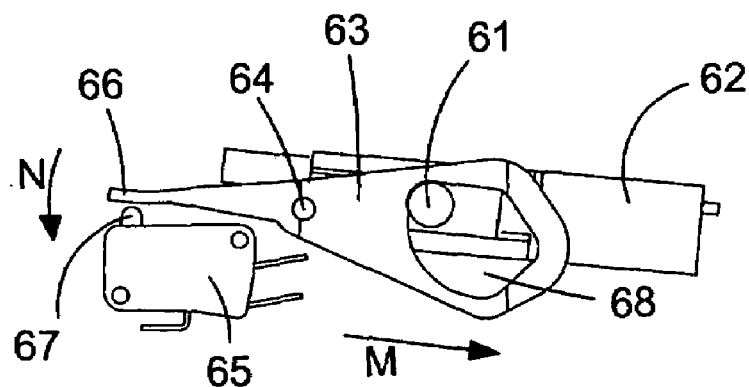
FIG. 14a is a side view of the switching mechanism and relay of the present invention in the open position where the handle assembly is in the horizontal orientation relative to the housing.

Referring to FIG. 14a, a pin (61) is held in a pin housing (62) which is disposed in the hedge trimmer handle assembly (not shown). The pin (61) and pin housing (62) are slidable relative to the hedge trimmer handle assembly (not shown) in the direction of arrow M. Pin (61) projects outwardly from housing (62) and is received in an aperture (68) formed in an arm member (63). Arm member (63) is mounted to the hedge trimmer body housing (not shown) by a pin (64). Arm member (63) is pivotable about pin (64) in the direction of arrow N relative to the hedge trimmer housing (not shown). An electrical relay (65) is disposed in the hedge trimmer housing (not shown) such that when arm (63) is pivoted in the direction of arrow N, a remote end (66) of arm (63) depresses a switch (67) and closes relay (65).

Figure 14B:
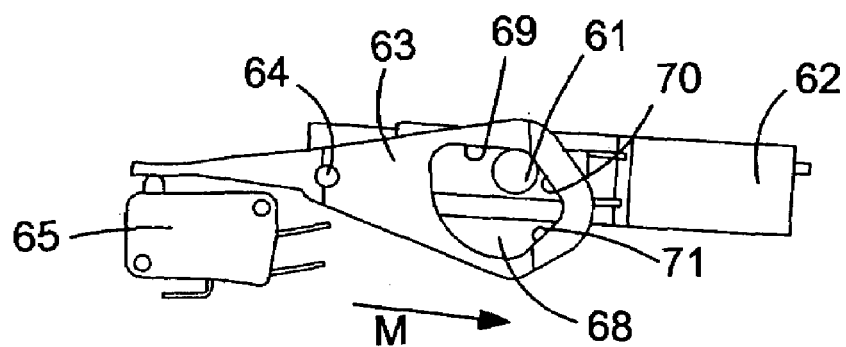
FIG. 14b is a side view of the switching mechanism of FIG. 14A in the partially closed position.
Figure 14C:
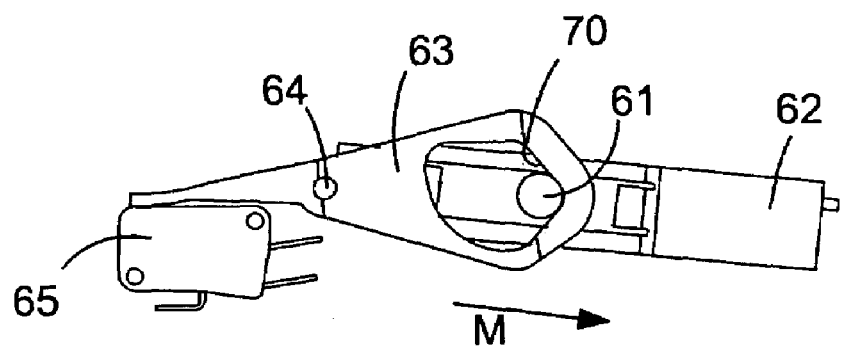
FIG. 14c is a side view of the switching mechanism and relay of FIG. 14A in which the relay is closed.

Referring now to FIG. 14b, when a first switch (not shown), is depressed by the user, a cable (not shown) causes pin (61) to slide in the direction of arrow M along cam surface (69) provided in aperture (68). It can be seen, however, that the movement of pin (61) is insufficient to cause arm member (63) to pivot about pin (64) and close relay (65). Referring now to FIG. 14c, in order to close the relay, the user must depress a second switch (not shown) provided on the handle assembly, which causes pin (61) to slide a further distance in the direction of arrow M along a second cam surface (70), provided in aperture (68), causing arm member (63) to pivot about point (64) and close the relay (65).

It can therefore be seen that in order to close the relay (65), a user must depress both first and second hedge trimmer switches, which in the embodiment of the hedge trimmer shown in FIG. 4 for example, would be switch (8) formed on front handle (6) and either one of switches (13), (14) formed on rear handle (7).

Figure 15A:
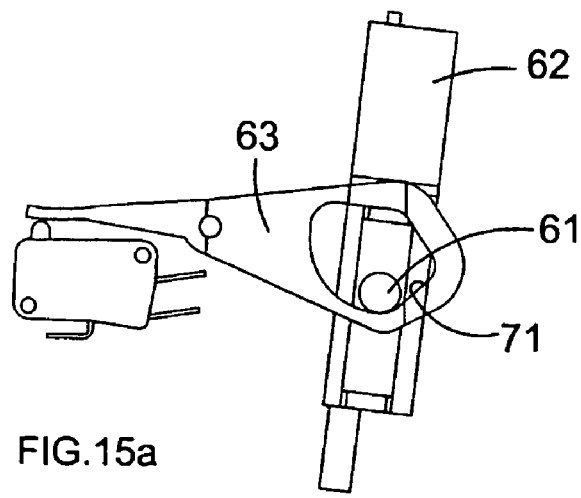
FIG. 15a is a side view of the switching mechanism of FIG. 14A in which the handle assembly is rotated through 90☐ relative to the housing and the switch and relay are in the open position.

Referring to FIG. 8, the hedge trimmer body housing (3) can be pivoted at 90° relative to the handle assembly (2). Referring now to FIG. 15a, the pin housing (62) is rotated through 90° from the position shown in FIG. 14a. Pin (61) now abuts third cam surface (71), and as the hedge trimmer housing has remained stationary, arm member (63) remains in the same position.

Figure 15B:
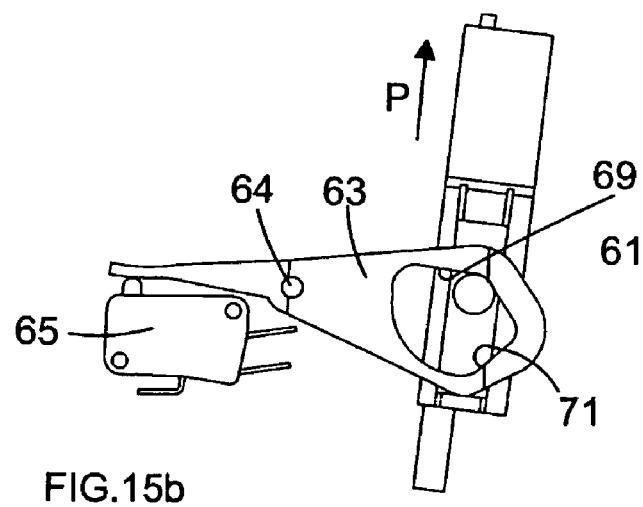
FIG. 15b is a side view of the switching mechanism of FIG. 15A in the partially closed position.

Referring now to FIG. 15b, when a user depresses a first switch (not shown), in the same way as shown in FIG. 14b except at 90° to FIG. 14b, pin (61) moves through a first distance in the direction of arrow P from cam surface (71) to cam surface (69). It can be seen however, that pin (61) has not moved sufficiently to pivot arm (63) about pin (64) to close relay (65).

Figure 15C:
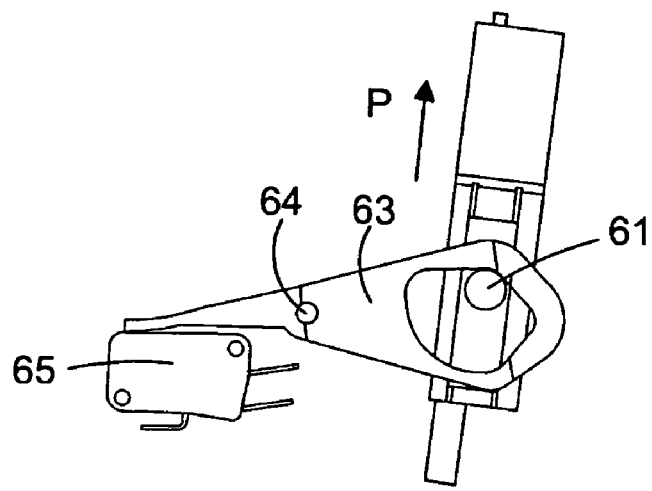
FIG. 15c is a side view of the switching mechanism of FIG. 15A in which the relay is closed.

Referring now to FIG. 15c, in order to close relay (65), the user must depress a second switch (not shown) which further moves pin (61) in the direction of arrow P thus pivoting arm (63) about pin (64) and completing the closure of relay (65).

Figure 11:
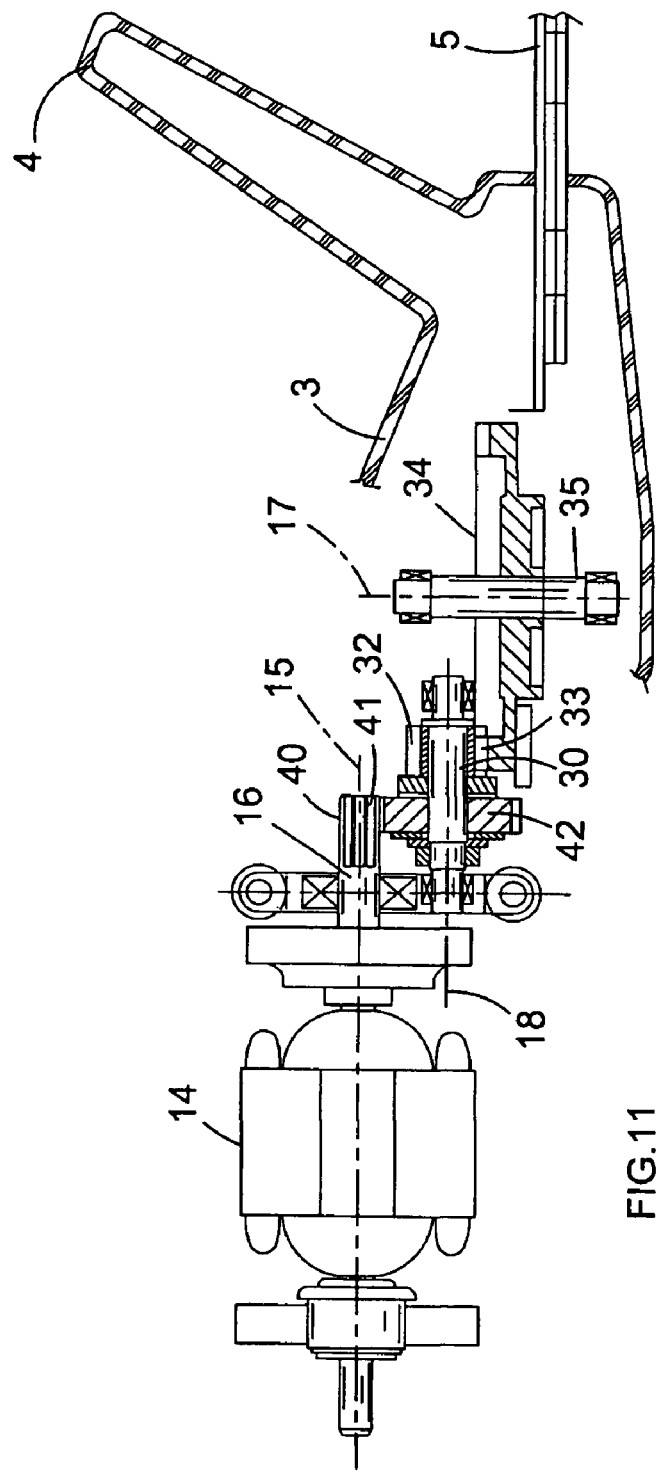
FIG. 11 is a side cross sectional view of the housing of a hedge trimmer incorporating the gear conversion mechanism of FIGS. 10a and 10b.

Referring now to FIG. 11, an electric motor (14) is disposed axially in housing (3), such that the axis of rotation (15) of the motor output shaft (16) is parallel to the plane of blade (5). It can be seen therefore that in order to drive the blade mechanism, the direction of rotation about axis (15) needs to be converted through 90° into rotation about axis (17).

Figure 10A:
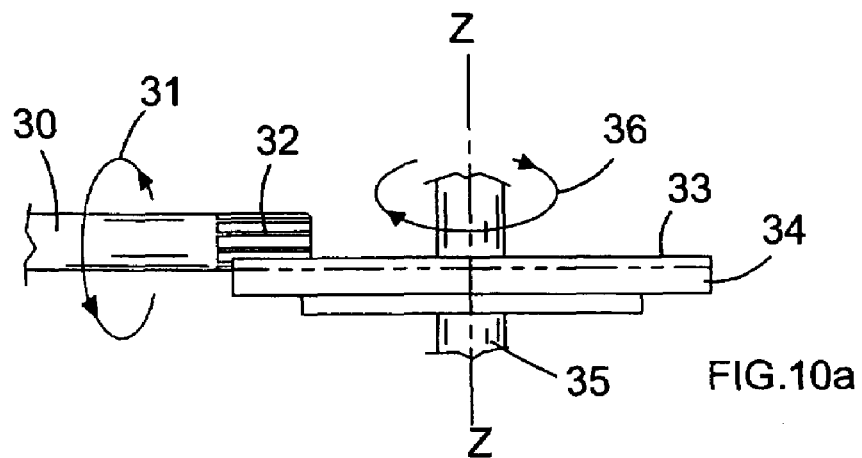
FIG. 10a is a cross sectional side view of the gear conversion mechanism of the present invention.
Figure 10B:
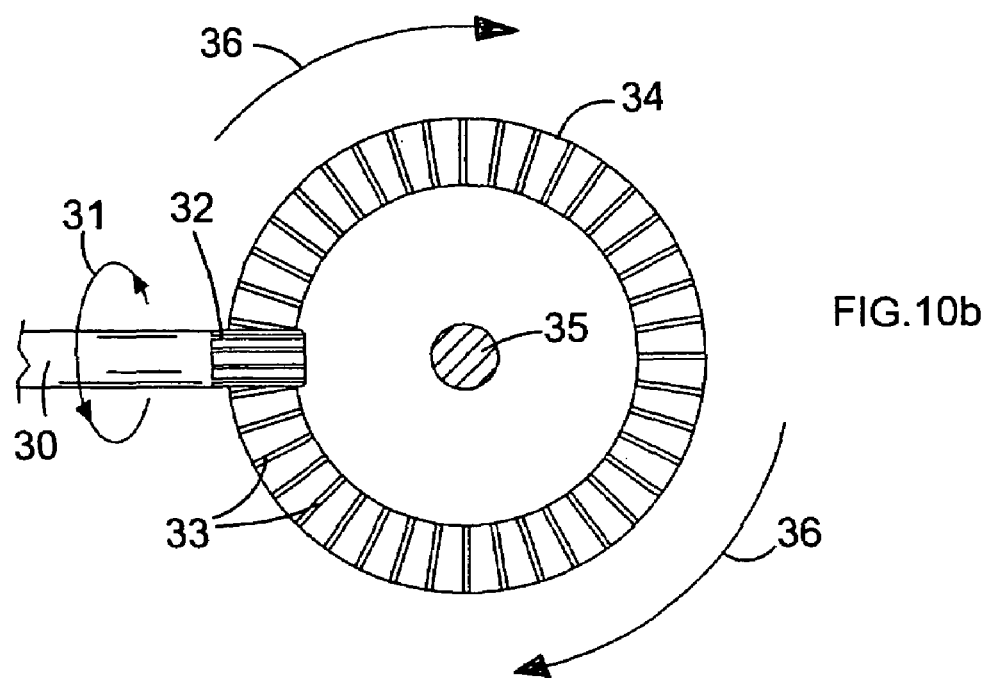

As shown in FIGS. 10a and 10b, the drive conversion mechanism of the present invention for converting rotation about a first axis to rotation about a second axis comprises a shaft (30) rotating in the direction of arrow (31). A plurality of axially aligned parallel teeth (32) are formed at the end of shaft (30). Parallel teeth (32) intermesh with a second plurality of radial teeth (33) formed on the upper surface of a gear plate (34). Gear plate (34) is mounted on a second shaft (35) such that gear plate (34) is free to rotate about an axis Z-Z. As a result of this, the rotation of shaft (30) imparts rotation to gear plate (35) in the direction of arrow (36) due to the reaction between teeth (32) and teeth (33).

This method of converting rotation about a first axis into rotation about a second axis generally perpendicular to said first axis is substantially less expensive to manufacture than prior art methods, as the engineering tolerances between teeth (32) and shaft (30) and teeth (33) on the gear plate (34) can be less than those needed to be achieved with the conical gears of the prior art drive mechanisms.

Referring again to FIG. 11, the incorporation of the drive conversion mechanism of FIGS. 10a and 10b into the hedge trimmer of the present invention will now be described.

An electric motor drives a rotary output shaft (16) adapted to rotate about axis (15). A plurality of teeth (40) are formed on the edge of shaft (16) and intermesh with a second plurality of teeth (41) formed on a gear (42). Gear (42) is adapted to rotate about axis (18) which is parallel to axis (15), and as gear (42) comprises a larger number of teeth (41) than the number of teeth (40) formed on output shaft (16), the rotational speed of gear (42) is less than that of output shaft (16). Gear (42) is mounted on a shaft (30) which has a further set of teeth (32) formed around the edge of shaft (30). Teeth (32) intermesh with a plurality of radial teeth (33) formed on the upper surface of a gear plate (34). Gear plate (34) is mounted on shaft (35) and adapted to rotate about axis (17) such that the rotation of shaft (30) about axis (18) is converted to rotation about axis (17) generally perpendicular to axis (18).

It can therefore be seen that the teeth on shaft (32) can still drive gear plate (34) despite variations in position between the shaft and the gear plate, provided the teeth on the shaft still engage the teeth on the gear plate. The shaft and gear plate therefore do not need to be as accurately located relative to each other as the bevel gears of the prior art.

It can also be seen that the inline rotation of the motor output shaft (16) is converted into rotation in the plane of blade (5). The blade (5) is connected to gear plate (34) via a drive conversion mechanism for converting rotary motion about axis (17) into linear reciprocating motion perpendicular to axis (17) in a manner which will be familiar to persons skilled in the art, such as a scotch yoke mechanism. Mechanisms of this type are well known in the art and will not be described herein in any further detail.

Referring to FIGS. 18 to 24, in which parts common to the embodiments of FIGS. 14 to 17 are denoted by like reference numerals but increased by 100, a hedge trimmer housing 103 of a third embodiment of the invention has a first clam shell half 200 and second clam shell half 202, the clam shell halves 200, 202 defining respective apertures 204, 206 for pivotably receiving a handle assembly 208 (FIG. 19) of the hedge trimmer. The first clam shell half 200 receives a lever 210, one end of which carries a first retaining member 181, the retaining member 181 being urged outwardly of the housing by a short, strong compression spring 186 arranged between the clam shell half 200 and the lever 210. By using a short compression spring 186, a stronger spring can be used than in the embodiment of FIGS. 16 and 17. A second retaining member 182 and lever 189 are attached to the clam shell half 200 via pivot pin 188, and an end of the lever 189 is located in a recess on the lever 210 such that longitudinal movement of lever 210 (and therefore first retaining member 181) causes pivotal movement of second retaining member 182 relative to the housing 103.

The lever 210 is connected to a release button 212 (FIG. 22) slidably mounted to the outside of the clam shell half 200, such that depression of the release button 212 causes longitudinal movement of lever 210 against the action of compression spring 186, in a manner similar to the embodiment of FIGS. 16 and 17. The lever 210 carries an interlock member 214, the purpose of which will be described in greater detail below.

Figure 18:
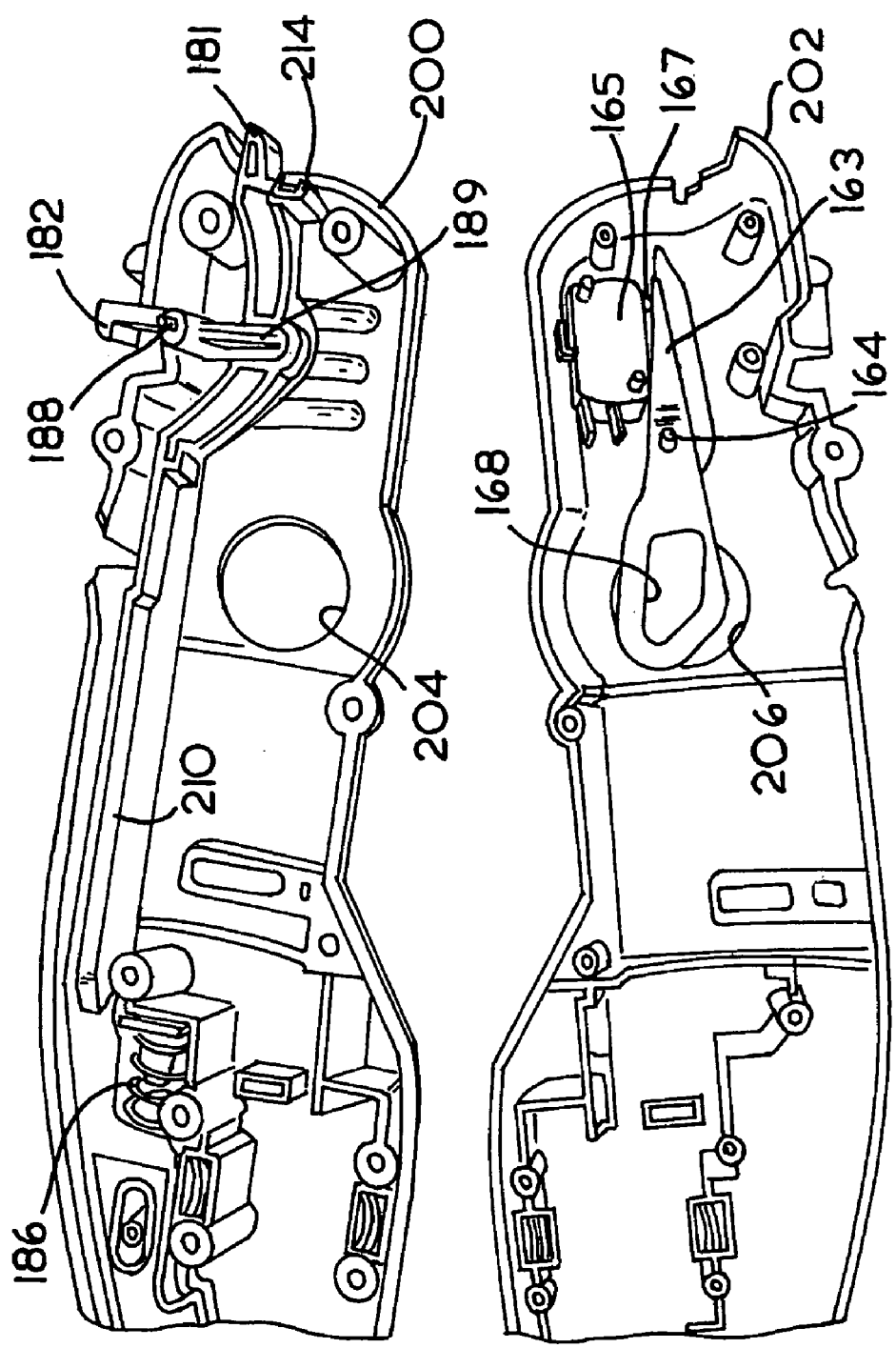
FIG. 18 is a view of the housing of a hedge trimmer of a third embodiment of the present invention, with the clamshell halves of the housing separated.
Figure 19:
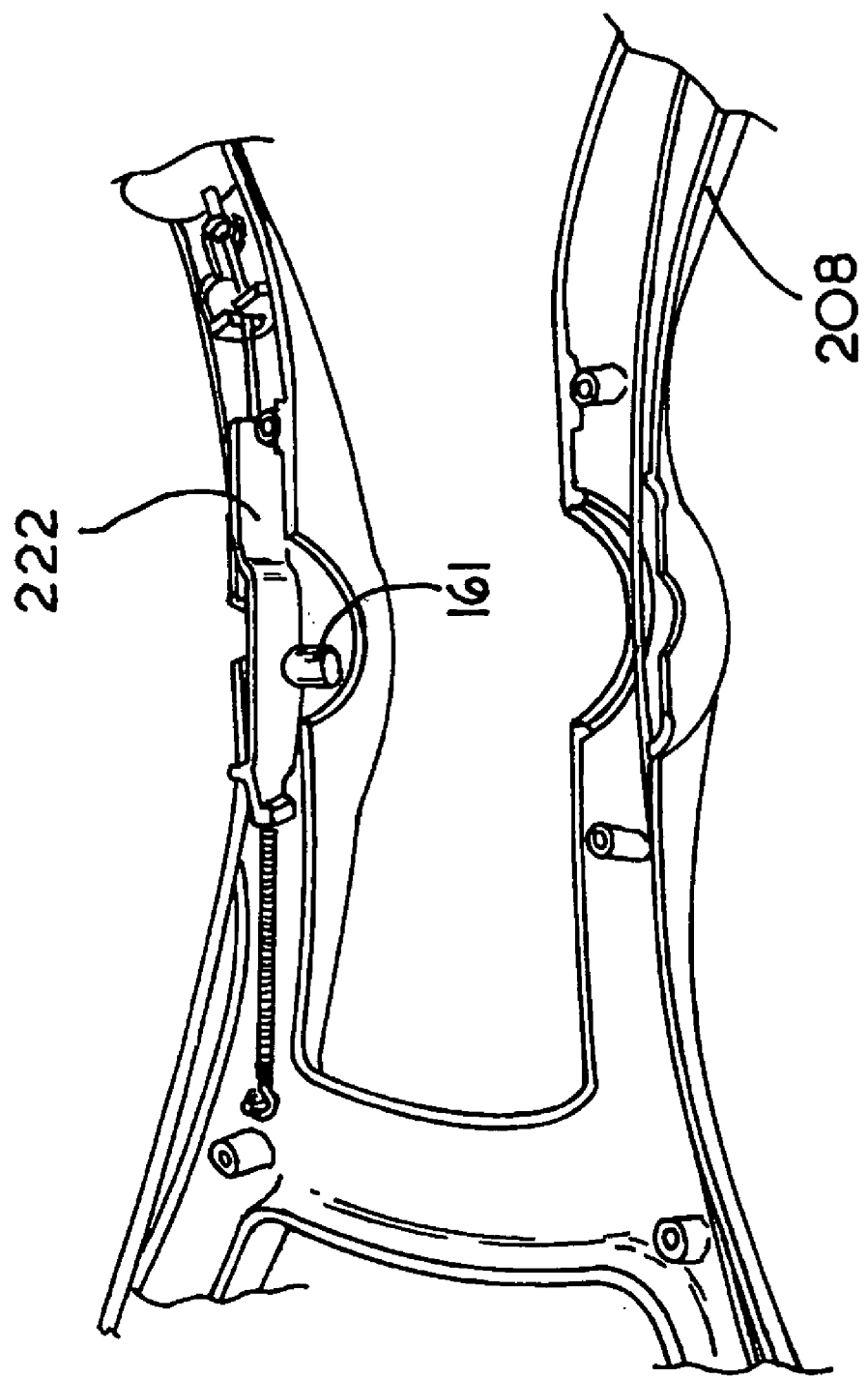
FIG. 19 is a perspective view of part of the handle assembly of the hedge trimmer of FIG. 18.
Figure 20:
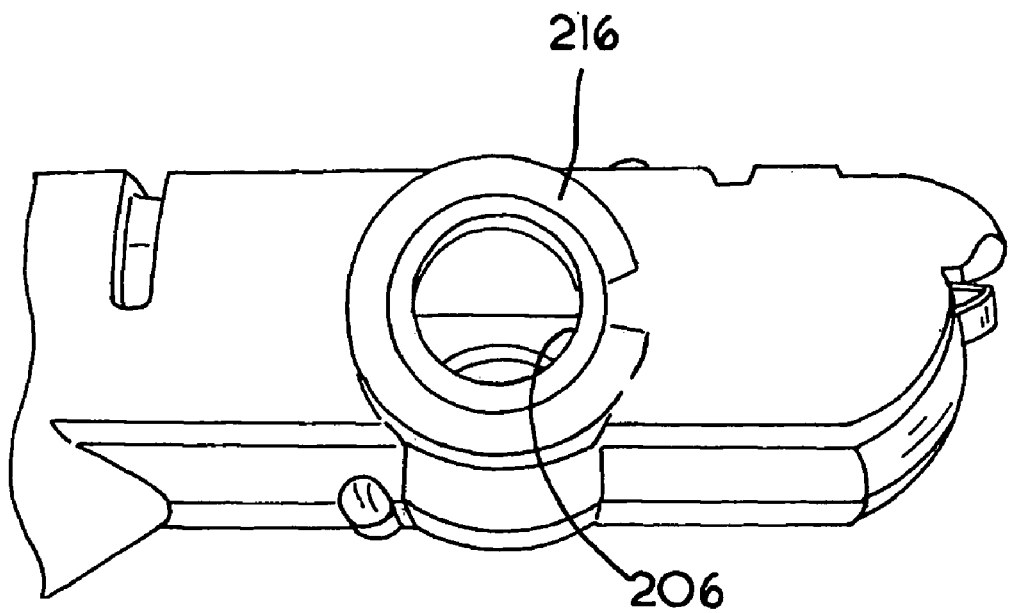
FIG. 20 is a view of the exterior of a rear part of the housing of the hedge trimmer of FIG. 18.
Figure 22:
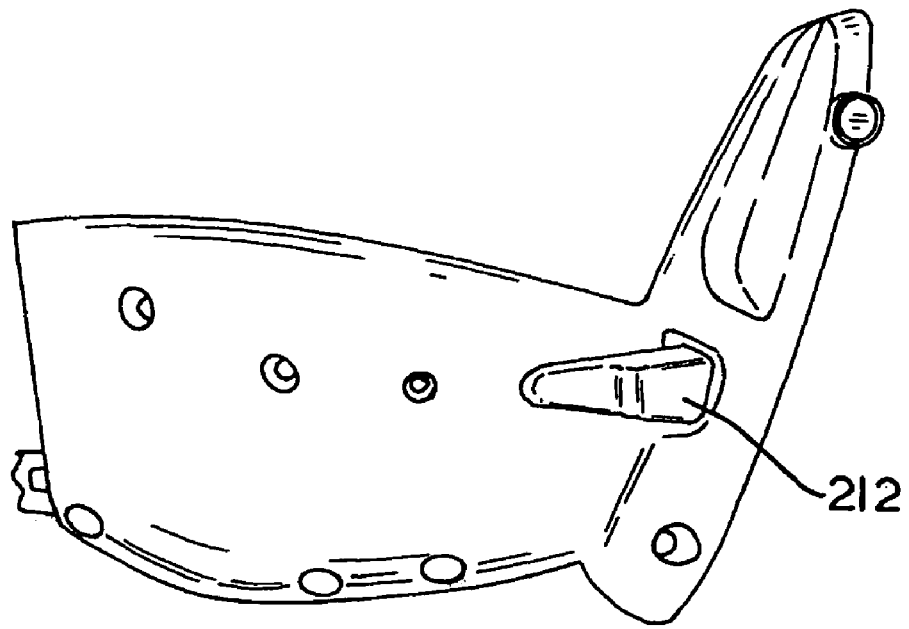
FIG. 22 is an external view of the part of the housing of FIG. 21.
Figure 21:
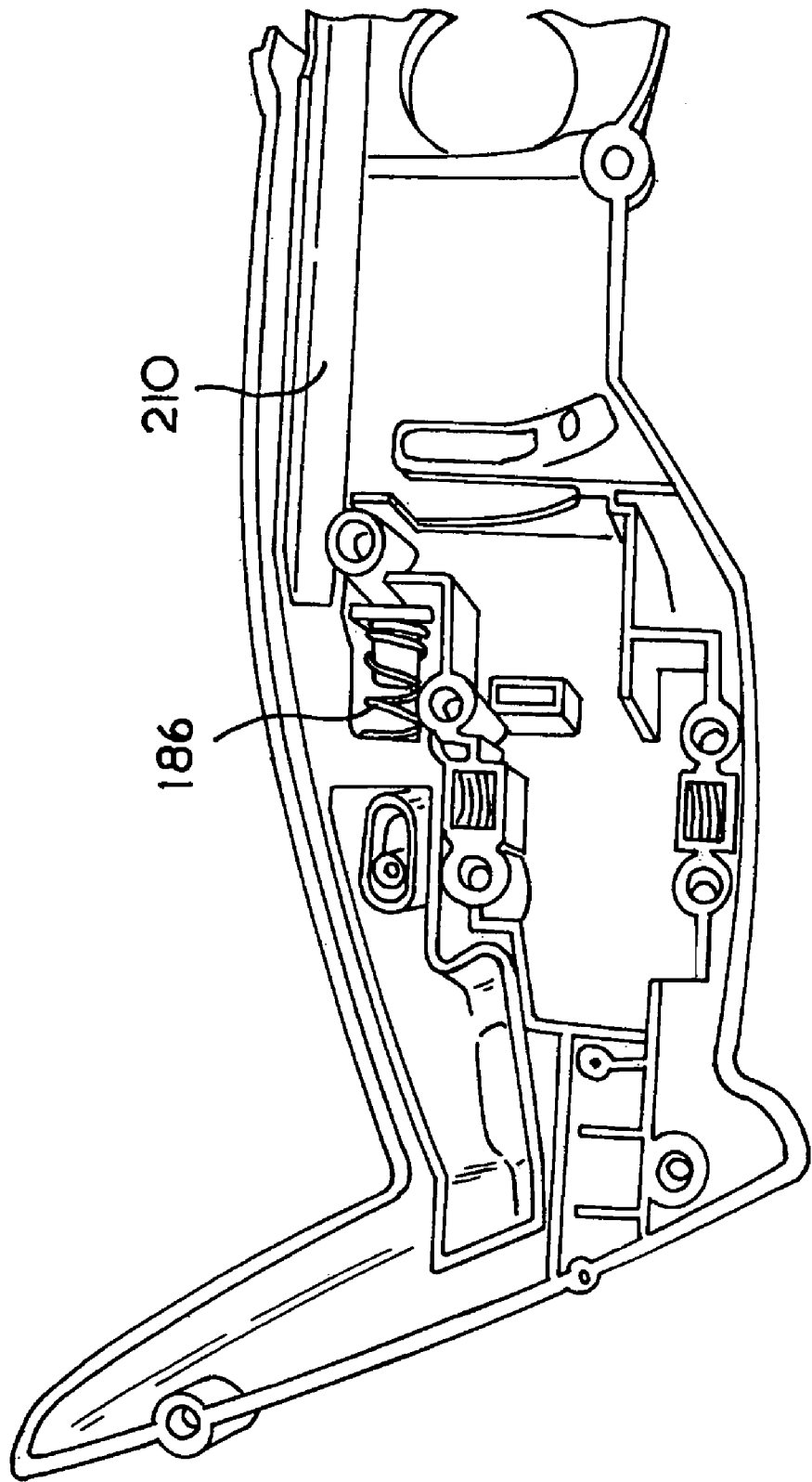
FIG. 21 is an internal view of a front part of the housing of FIG. 20.

The second clam shell half 202, which mates with first clam shell half 200 to form the housing 103, accommodates an electrical relay 165 for actuating the motor (not shown) of the hedge trimmer. The relay 165 has a first switch member 167 which actuates the hedge trimmer motor by being pressed inwardly of electrical relay 165 by pivotal movement of arm member 163 relative to clam shell half 202 about pin 164. The relay 165 also carries a second switch member (not shown) located behind the first switch member 167 as shown in FIG. 18 and adapted to be disabled by being urged inwardly of the relay 165 by arm member 163, and is actuated by being released from the relay 165 by approximately half the distance first switch member 167 needs to protrude from the relay 165 to disable the motor. Actuation of the second switch short circuits the motor to cause a braking action which brings the hedge trimmer blade to a halt more quickly, thus improving the safety of the hedge trimmer. The arm member 163 has an aperture 168 which is engaged by a pin 161 on a support 222 slidably mounted to handle assembly 208 (FIG. 19). A radially protruding segment 216, the function of which will be described in greater detail below, is provided adjacent aperture 206 on clam shell half 202.

Figure 23:
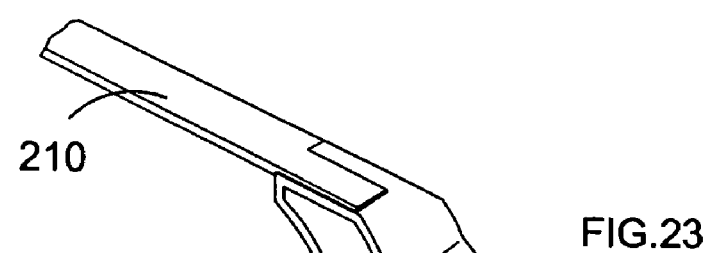
FIG. 23 is a schematic perspective view of an actuator member and interlock member of the hedge trimmer of FIG. 18 in a first condition in which the motor of the hedge trimmer is actuated.
Figure 24:
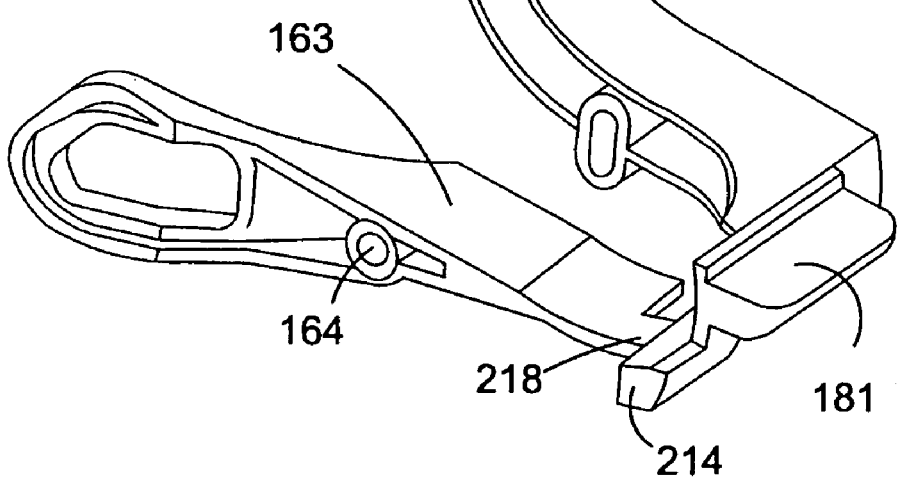
FIG. 24 is a schematic view, corresponding to FIG. 23, of the actuator member and interlock member of FIG. 23 in a second condition in which the motor is prevented from being actuated.

Referring now to FIGS. 23 and 24, when the arm member 163 is pivoted downwards about pin 164 to press first switch member 167 inwardly of relay 165 to actuate the motor, axial movement of the lever 210 so as to retract first retaining member 181 into the housing 103 to enable pivoting of the housing 103 relative to the handle assembly 208 brings interlock member 214 into abutment with an end 218 of arm member 163. This prevents further axial movement of lever 210 so that the first 181 and second 182 retaining members cannot be retracted into the housing. As a result, when the hedge trimmer motor is actuated, it is not possible to release the handle assembly 208 from the housing 103 to allow pivotal movement of the handle assembly relative to the housing.

As shown in FIG. 24, when the lever 210 is moved axially sufficiently to retract first retaining member 181 and second retaining member 182 into the housing 103 sufficiently to allow pivotal movement of the handle assembly 204 relative to the housing 103, the end 218 of arm member 163 is located on top of interlock member 214, which prevents the arm member 163 being pivoted downwardly about pin 164 to actuate the hedge trimmer motor. Accordingly, when the latch mechanism is released from the handle assembly, the hedge trimmer motor cannot be actuated. As a further safety feature, when the handle assembly 208 is located in an orientation relative to the housing 103 between the end positions in which the first 181 or second 182 retaining member engages cooperating parts of the handle assembly 208, the radially projecting segment 216 (FIG. 20) around aperture 206 prevents longitudinal movement of the support 220 (FIG. 19) carrying pin 161 relative to the handle assembly 208. This in turn prevents movement of the pin 161 relative to aperture 168 in arm member 163, which therefore prevents pivoting of arm member 163 about pin 164 when the housing 103 is not latched to the handle assembly 208 in one of its two working positions relative to the handle assembly 208, as a result of which the hedge trimmer motor cannot be actuated.

The operation of the embodiment shown in FIGS. 18 to 24 will now be described.

When the housing 103 is located relative to the handle assembly 208 such that the housing 103 is in one of the two working orientations relative to the handle assembly 208, the handle assembly 208 is engaged by the first 181 or second 182 retaining member, as a result of which the retaining members 181, 182 protrude from the housing 103 and the arm member 163 can freely pivot about pin 164 to actuate the motor. When the motor is actuated, the end 218 of the arm member 163 becomes located behind interlock member 214 to prevent retraction of the retaining members 181, 182 into the housing 103, as a result of which the housing 103 cannot be released from the handle assembly 208 or pivoted relative to the handle assembly 208.

When the ON/OFF switches (not shown) on handle assembly 208 are released, the arm member 163 pivots away from relay 165 to enable the first 167 and second switch members to protrude outwardly of the relay 165 to de-energise the motor and apply a braking action by short circuiting the motor. At the same time, the end 218 of arm member 163 is now located above interlock member 214, as a result of which it can slide over the end 218 of arm member 163 to enable the retaining members 181, 182 to be retracted into the housing 103 by depressing release button 212. Once the interlock member 214 becomes located behind end 218 of arm member 163, the arm member 163 can no longer be pivoted towards the relay 165 to actuate the motor. As the handle assembly 208 is pivoted relative to the housing 103, the retaining members 181, 182 may again protrude from the housing 103 to enable arm member 163 to pivot into contact with the relay 165. However, pivotal movement of the arm member 164 is prevented because radially projecting segment 216 comes into engagement with pin support 222 to prevent axial movement of pin 161 relative to the handle assembly 208, as a result of which the pin 161 cannot cause pivotal movement of arm member 163.

Figure 25:
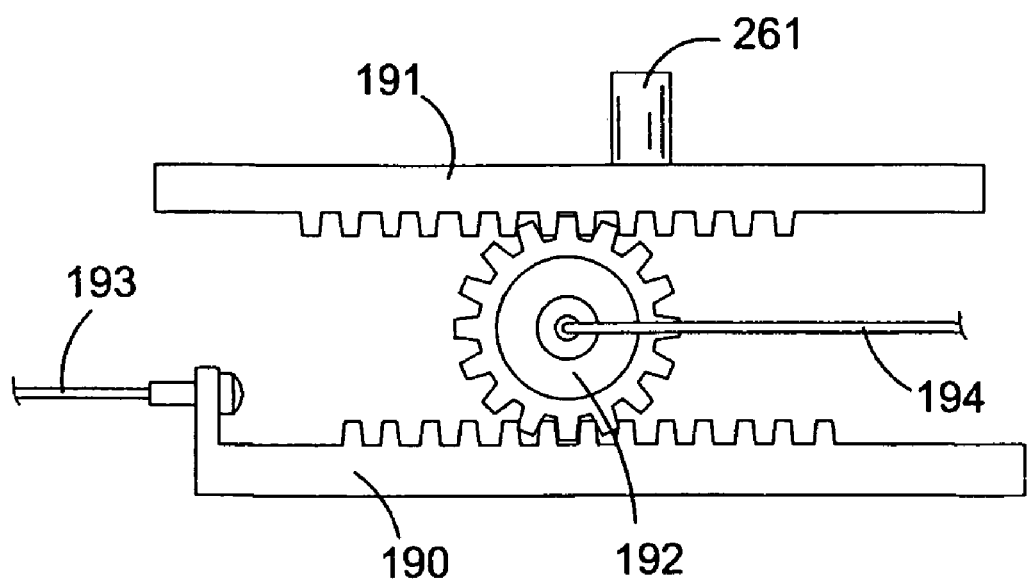
FIG. 25 shows a rack and pinion arrangement for use in an alternative embodiment to that shown in FIG. 19.

Referring now to FIG. 25, an alternative arrangement to that shown in FIG. 19 is illustrated, and parts common to the embodiment of FIG. 19 are denoted by like reference numerals but increased by 100. A pair of rack members (190), (191) engage a pinion (192). The rack member (190) is connected via wire (193) to a switch on rear handle (107), while the pinion (192) is connected via wire (194) to front handle (106), the pin (261) being mounted on rack member (191).

When the front (106) or rear (107) handle is actuated, the rack member (191) is displaced relative to the hedge trimmer housing (103), but is displaced an insufficient distance to cause pin (261) to actuate the hedge trimmer motor. However, sufficient displacement of the pin (261) to actuate the motor occurs if the front (106) and rear (107) handles are actuated simultaneously.

It will be appreciated by persons skilled in the art that the above embodiments have been described by way of example only and not in any limitative sense, and that various alterations and modification are possible without departure from the scope of the invention as defined by the appended claims.

The invention claimed is:

1. A latch mechanism for a power tool having a housing, a motor provided in the housing, an output shaft adapted to be caused by said motor to actuate a working member, and a handle assembly adapted to pivot relative to the housing between a plurality of positions, the latch mechanism comprising:

first detent means having a first detent member adapted to move relative to the housing between an engaging condition to engage said handle assembly to releasably retain the housing in a first position relative to the handle assembly, and a retracted condition for allowing pivotal movement of said housing relative to said handle assembly;

second detent means having a second detent member adapted to move relative to the housing between an engaging position to engage said handle assembly to releasably retain the housing in a second position relative to the handle assembly, and a retracted condition for allowing pivotal movement of said housing relative to said handle assembly;

biasing means for urging said first detent member and said second detent member towards said engaging condition; and interlock means for preventing disengagement of said first or second detent means from said handle assembly when said motor is actuated, and for preventing actuation of said motor when said first or second detent member is in a said retracted condition.

2. A mechanism according to claim 1, further comprising electrical switch means adapted to be located in said housing for actuating said motor, wherein said interlock means is adapted to prevent actuation of said switch means when said first or said second detent member is in said retracted condition.

3. A mechanism according to claim 2, wherein the electrical switch means comprises a switch housing having a plurality of electrical contacts, a first switch member adapted to be pressed inwardly of said switch housing to energise said motor, and a second switch member adapted to brake said motor when said first switch member energises said motor, and to be pressed inwardly of the switch housing to disable said braking action.

4. A mechanism according to claim 3, wherein the second switch member is adapted to brake said motor by short-circuiting said motor.

5. A mechanism according to any one of claim 2, further comprising at least one actuator member adapted to engage said electrical switch means, wherein said interlock means comprises an interlock member connected to said first and second detent member for preventing said actuator member from engaging said electrical switch means when said first or second detent member is in said retracted condition.

6. A mechanism according to claim 5, wherein at least one said actuator member is adapted to abut said interlock member when said electrical switch means is actuated to prevent movement of at least one said first or second detent member relative to the housing to a retracted condition thereof.

7. A mechanism according to claim 5, wherein at least one said actuator member is adapted to pivot relative to the housing to engage said electrical switch means, and said interlock member is adapted to abut said actuator member to prevent pivoting thereof into engagement with said switch means when said first or second detent member is in said retracted condition.

8. A mechanism according to claim 5, further comprising at least one pin adapted to be slidably mounted to said handle assembly to engage at least one respective cam surface on at least one said actuator member to pivot said actuator member relative to said housing.

9. A mechanism according to claim 1, wherein the first and second detent means are located in the housing.

* * * * *